US012761835B2

(12) United States Patent
Yu et al.

(10) Patent No.: US 12,761,835 B2
(45) Date of Patent: Oct. 13, 2026

(54) STORAGE DEVICE CONTROLLING INPUT/OUTPUT OPERATION BASED ON MODE OF OPERATIONS AND ELECTRONIC DEVICE INCLUDING THE SAME

(71) Applicant: Samsung Electronics Co., Ltd., Suwon-si (KR)

(72) Inventors: Daehun Yu, Suwon-si (KR); Sungwook Kim, Suwon-si (KR); Byungyo Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 80 days.

(21) Appl. No.: 18/493,212

(22) Filed: Oct. 24, 2023

(65) Prior Publication Data

US 2024/0143237 A1 May 2, 2024

(30) Foreign Application Priority Data

Oct. 26, 2022 (KR) ........................ 10-2022-0139670
Dec. 12, 2022 (KR) ........................ 10-2022-0173060

(51) Int. Cl.
*G06F 3/06* (2006.01)

(52) U.S. Cl.
CPC .......... *G06F 3/0659* (2013.01); *G06F 3/0613* (2013.01); *G06F 3/0634* (2013.01); *G06F 3/0679* (2013.01)

(58) Field of Classification Search
CPC ........... G06F 3/0634; G06F 2212/7201; G06F 2212/7202
See application file for complete search history.

(56) References Cited

U.S. PATENT DOCUMENTS

| | | | |
|---|---|---|---|
| 7,646,636 | B2 | 1/2010 | Kim |
| 8,482,996 | B2 | 7/2013 | Oh |
| 9,383,927 | B2 | 7/2016 | Thomas |
| 9,847,105 | B2 | 12/2017 | Kim et al. |

(Continued)

FOREIGN PATENT DOCUMENTS

| | | |
|---|---|---|
| CN | 101617372 A | 12/2009 |

OTHER PUBLICATIONS

Extended European Search Report issued Apr. 3, 2024 in European Application No. 23204795.1.

*Primary Examiner* — Nicholas A. Paperno
(74) *Attorney, Agent, or Firm* — Harness, Dickey & Pierce, P.L.C.

(57) ABSTRACT

Provided is a storage device including a memory, a plurality of non-volatile memories (NVMs), and a controller. The plurality of non-volatile memories have an access speed which is slower than that of the memory. The controller is configured to control a first data input/output operation with a host device using the plurality of NVMs, based on a first map table in the memory, in a first mode, and control a second data input/output operation with the host device, based on a second map table in the memory, in a second mode. The storage device is configured to switch between the first and second modes. The first map table includes physical addresses of the plurality of NVMs for accessing first data corresponding to the first data input/output operation. The second map table includes physical addresses of the first memory for accessing second data corresponding to the second data input/output operation.

18 Claims, 38 Drawing Sheets

(56) References Cited

U.S. PATENT DOCUMENTS

| | | | | |
|---|---|---|---|---|
| 10,459,635 | B2 | 10/2019 | Call et al. | |
| 10,628,326 | B2 | 4/2020 | Haswell | |
| 10,915,440 | B2 | 2/2021 | Frolikov | |
| 11,182,286 | B2 | 11/2021 | Chen et al. | |
| 11,307,979 | B2 | 4/2022 | Chung | |
| 11,334,274 | B2 | 5/2022 | Kabra et al. | |
| 11,416,153 | B2 | 8/2022 | Iwata et al. | |
| 2007/0067602 | A1* | 3/2007 | Callister | G06F 12/0842 711/E12.039 |
| 2015/0074294 | A1* | 3/2015 | Shacham | G06F 3/0659 710/5 |
| 2017/0315925 | A1 | 11/2017 | Yeh | |
| 2018/0129414 | A1 | 5/2018 | Yeh | |
| 2021/0255961 | A1* | 8/2021 | Byun | G06F 12/0638 |
| 2021/0311879 | A1 | 10/2021 | Kang | |
| 2021/0374051 | A1* | 12/2021 | Makuni | G06F 12/0246 |
| 2023/0350765 | A1* | 11/2023 | Madan | H04L 67/1097 |

* cited by examiner

BLKi

FIG. 6A

TB1

| FEATURE IDENTIFIER | DESCRIPTION |
|---|---|
| ID1 | LBA RANGE TYPE |
| ID2 | ERROR RECOVERY |
| ID3 | WRITE ATOMICITY NORMAL |
| ID4 | LBA STATUS INFORMATION REPORT INTERVAL |
| ID5 | MODE MANAGEMENT |

FIG. 6B

TB2

| VALUE | DESCRIPTION |
|---|---|
| V1 | OPERATING IN THE FIRST MODE |
| V2 | CHANGEABLE TO THE SECOND MODE |
| V3 | OPERATING IN THE SECOND MODE |

FIG. 13A

TB

| DESCIPTION | VALUE / NAMESPACE REGION |
| --- | --- |
| COMMON NAMESPACE FEATURES | 00/1st NAMESPACE REGION |
| | 01/2nd NAMESPACE REGION |

FIG. 13B

TB'

| DESCIPTION | LOW BITS / MEMORY TYPE |
|---|---|
| COMMON NAMESPACE FEATURES | 00/1st NAMESPACE REGION (TLC) |
| | 01/2ST NAMESPACE REGION |
| | 10/3rd NAMESPACE REGION (QLC) |
| | 11/4th NAMESPACE REGION (MLC) |

STORAGE DEVICE CONTROLLING INPUT/OUTPUT OPERATION BASED ON MODE OF OPERATIONS AND ELECTRONIC DEVICE INCLUDING THE SAME

CROSS-REFERENCE TO RELATED APPLICATIONS

This application is based on and claims priority under 35 USC § 119 to Korean Patent Application Nos. 10-2022-0139670, filed on Oct. 26, 2022, and 10-2022-0173060, filed on Dec. 12, 2022, in the Korean Intellectual Property Office, the disclosures of each of which are incorporated by reference herein in their entireties.

BACKGROUND

The inventive concepts relate to a storage device, and more particularly, to a storage device including non-volatile memories, and an electronic device including the same.

Recently, storage devices including non-volatile memories are increasing in capacity. As the size of a map table used for access to non-volatile memories increases as the capacity increases, the capacity of a memory of a storage device in which the map table is stored also increases. Since the memory of a storage device is implemented with a volatile memory having a high production cost, such as dynamic random-access memory (DRAM), a method for increasing the utilization of the memory of the storage device is required.

SUMMARY

The inventive concepts provide a storage device for selecting one of the first mode and the second mode and performing a data input/output operation based on the selected mode to increase the utilization of a memory included in the storage device and an electronic device including the same.

According to an aspect of the inventive concepts, there is provided a storage device including a first memory, a plurality of non-volatile memories having an access speed slower than an access speed the first memory, and a controller configured to control a first data input/output operation with a host device using the plurality of non-volatile memories based on a first map table stored in the first memory in a first mode, and control a second data input/output operation with the host device using the memory based on a second map table stored in the memory in a second mode, wherein the storage device is configured to switch between the first and second modes.

According to another aspect of the inventive concepts, there is provided a storage device including a volatile memory, a plurality of non-volatile memories, input/output resources configured to communicate with a host device, and a controller control a second data input/output operation with the host device using the volatile memory during a mode in which the input/output resources are not occupied by a first data input/output operation using the plurality of non-volatile memories.

According to another aspect of the inventive concepts, there is provided an electronic devices including a first storage device including a first volatile memory and a plurality of first non-volatile memories, a memory device including a second volatile memory, and a host device configured to drive an application using the first storage device and the memory device, wherein the first storage device is configured to support a first mode, based on a first data input/output operation, using the first non-volatile memories, and a second mode, based on a second data input/output operation, using the first volatile memory.

According to another aspect of the inventive concepts, there is provided a storage device including a first memory, a second memory having a slower access speed than the first memory and including a first namespace region and a second namespace region, and a controller configured to control a first data input/output operation with a host device using the first namespace region based on a first map table stored in the first memory in a first mode and control a second data input/output operation with the host device using the first memory based on a second map table stored in the first memory in a second mode.

BRIEF DESCRIPTION OF THE DRAWINGS

Embodiments will be more clearly understood from the following detailed description taken in conjunction with the accompanying drawings in which:

FIG. 6A is a table diagram for describing a get feature command or a set feature command, according to at least one embodiment, and FIG. 6B is a table diagram for describing mode state information according to at least one embodiment;

FIGS. 13A and 13B are diagrams illustrating tables for explaining information about a namespace region of FIG. 12;

DETAILED DESCRIPTION OF THE EMBODIMENTS

Figure 1:
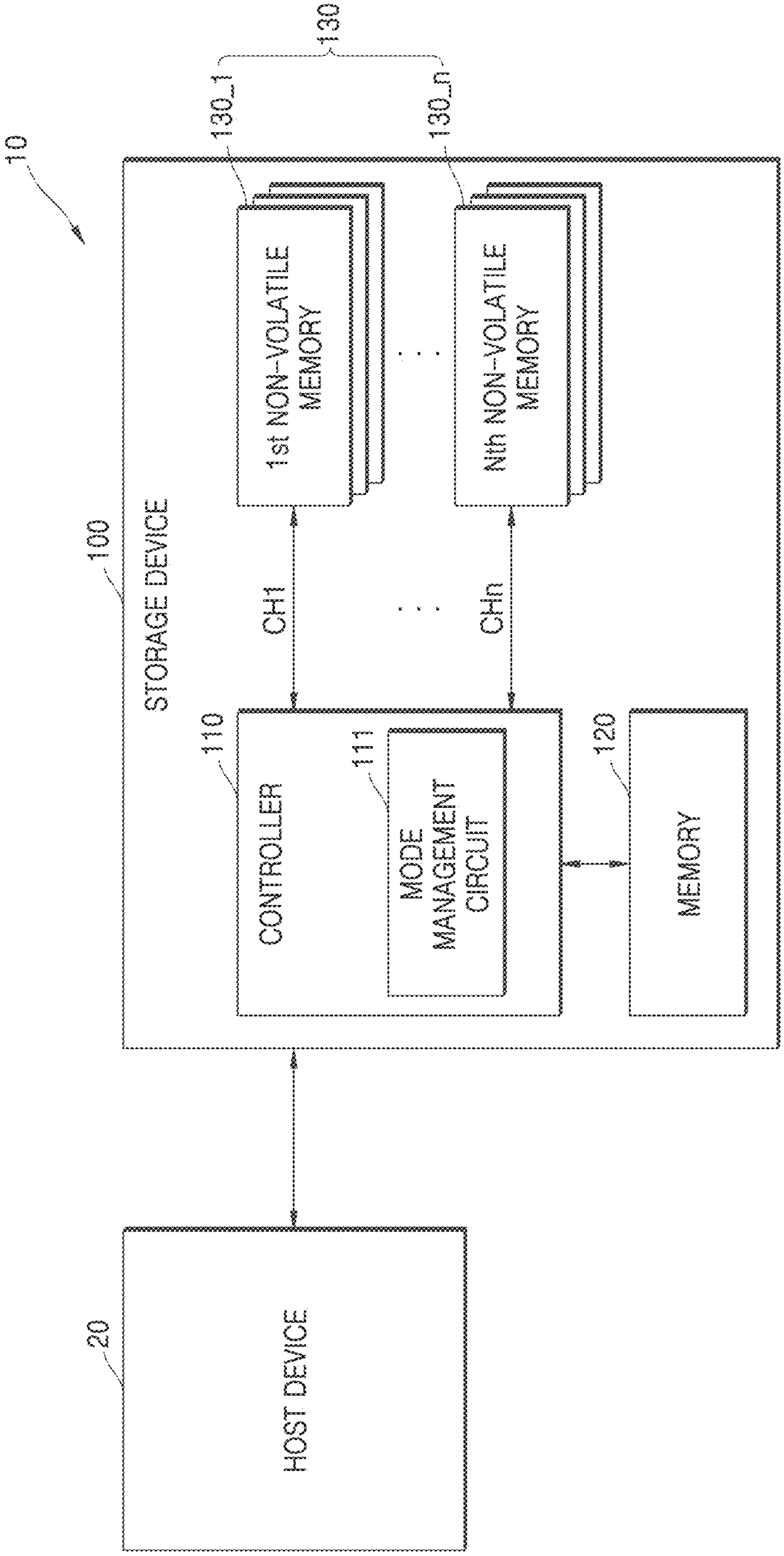
FIG. 1 is a schematic block diagram of an electronic device according to at least one embodiment.

Hereinafter, embodiments of the technical idea of the inventive concepts will be described in detail with reference to the accompanying drawings. The same reference numerals are used for the same components in the drawings, and redundant descriptions thereof will be omitted.

FIG. 1 is a schematic block diagram of an electronic device 10 according to at least one embodiment.

Referring to FIG. 1, the electronic device 10 includes a host device 20 and a storage device 100. The electronic device 10 in this specification may also be referred to as a computing system. In at least one embodiment, the storage device 100 may be implemented as a solid state drive.

The host device 20 is configured to communicate with the storage device 100, e.g., through an interface. For example, the host device 20 may write data to the storage device 100 and/or read data written to the storage device 100 through the interface. In at least one embodiment, the interface may include at least one of a universal serial bus (USB), a multimedia card (MMC), a PCI-Express (PCI-E), an Advanced Technology (AT) attachment (ATA), a serial AT attachment (SATA), a parallel AT attachment (PATA), a small computer system interface (SCSI), serial an attached SCSI (SAS), an enhanced small disk interface (ESDI), an integrated drive electronics (IDE), and/or the like.

The host device 20 may be configured to drive a plurality of applications, and to use the storage device 100 when driving the plurality of applications. In some embodiments, the host device 20 may drive a plurality of applications by further using at least one of a memory device (not shown) and/or another storage device (not shown). Embodiments related to this will be described later with reference to FIGS. 17 and 18 to 22.

Referring to FIG. 1, the storage device 100 may include a memory controller 110, at least one memory 120, and a plurality of non-volatile memories 130. The non-volatile memories 130 may include first to n-th non-volatile memories 130_1 to 130_*n* connected to the controller 110 through first to n-th channels CH1 to CHn.

In at least one embodiment, the non-volatile memories 130 may include at least one type of non-volatile memory, such as flash memory, phase-change random access memory (RAM) (PRAM), magnetic RAM (MRAM), resistive RAM (RRAM), ferroelectric RAM (FRAM), and/or the like. In the following description, the embodiments are described centering on an example in which the non-volatile memories 130 are implemented as NAND flash memories, but it will be fully understood that implementation of the examples of the non-volatile memories 130 are not limited thereto.

In at least one embodiment, the memory 120 is configured to support a faster access speed compared to the non-volatile memories 130. For example, the memory 120 may include at least one type of volatile memory, such as dynamic RAM (DRAM), static RAM (SRAM), synchronous RAM (SDRAM), and/or the like. However, the examples are not limited thereto, and in some embodiments, the memory 120 may be implemented as a non-volatile memory that supports a higher access speed than the non-volatile memories 130. In this specification, the embodiments are described centering on an example in which the memory 120 is implemented as a volatile DRAM, but it will be fully understood that the implementation of the examples of the memory 120 is not limited thereto. Therefore, for clarity and brevity, the memory 120 may be referred to as volatile memory in this specification.

As at least one embodiment, the controller 110 is configured to control overall operations of the storage device 100 and may include a mode management circuit 111 to support said operations. For example, the mode management circuit 111 may control operations related to changing the operation mode of the storage device 100, as described in further detail below. The mode management circuit 111 may be implemented in processing circuitry such as hardware including logic circuits; a hardware/software combination such as circuitry executing software; and/or a combination thereof. For example, the mode management circuit 111 may include hardware logics for performing operations according to some example embodiments; and/or when the mode management circuit 111 is implemented in software, the controller 110 may perform operations according to embodiments of the mode management circuit 111 by executing codes corresponding to the mode management circuit 111. For brevity, the operation of the mode management circuit 111 may also be interpreted as the operation of the controller 110.

As at least one embodiment, the storage device 100 is configured to support, at least, a first mode and a second mode. The storage device 100 may perform a first data input/output operation with the host device 20 using the non-volatile memories 130 based on the first map table stored in the memory 120 in the first mode under the control of the controller 110; and the storage device 100 may perform a second data input/output operation with the host device 20 using the memory 120 based on the second map table stored in the memory 120 in the second mode under the control of the controller 110. In this specification, a mode may also be referred to as an operating mode. In the present specification, performing a data input/output operation based on a map table may include performing a data input/output operation with reference to the map table and/or updating the map table through the data input/output operation. Also, in this specification, the first mode may also be referred to as a standard mode, and the second mode may also be referred to as an advanced mode.

In at least one embodiment, the first data input/output operation may include at least one of an operation of writing the first data input to the storage device 100 to the non-volatile memories 130 together with the first write request of the host device 20, and/or an operation of reading first data from the non-volatile memories 130 in response to a first read request of the host device 20 and outputting the read first data to the host device 20. As such, in at least one embodiment, the first map table used for the first data input/output operation may indicate a mapping relationship between first logical addresses of the host device 20 and physical addresses of the non-volatile memories 130.

In at least one embodiment, the second data input/output operation may include at least one of an operation of writing, in the memory 120, data input to the storage device 100 together with a second write request of the host device 20, and an operation of reading second data from the memory 120 in response to a second read request from the host device 20 and outputting the read second data to the host device 20. As such, in at least one embodiment, the second map table used for the second data input/output operation may indicate a mapping relationship between second logical addresses of the host device 20 and physical addresses of the memory 120.

In at least one embodiment, first data may refer to data that is a target of a first data input/output operation, and second data may refer to data that is a target of a second data input/output operation.

In at least one embodiment, a write request from the host device 20 to the storage device 100 includes a write command and logical addresses, and a read request from the host device 20 to the storage device 100 may include a read command and logical addresses.

In at least one embodiment, when the operation mode of the storage device 100 is the first mode and satisfies a first change condition, the mode management circuit 111 is configured to change the operation mode of the storage device 100 from the first mode to the second mode. In addition, when the operation mode of the storage device 100 is the second mode and satisfies a second change condition, the mode management circuit 111 is configured to change the operation mode of the storage device 100 from the second mode to the first mode.

In some embodiments, the mode management circuit 111 may set the first mode as a basic mode and control the storage device 100 to operate mainly in the first mode. A certain example of the first change condition will be described later with reference to FIG. 5, and a certain example of the second change condition will be described later with reference to FIGS. 14 to 16. In at least one embodiment in which the first mode is set as the basic mode, the capacity of the memory 120 may correspond to the maximum size of the first map table used in the first data input/output operation. Since the physical addresses of the non-volatile memories also increase as the total capacity of the non-volatile memories increases, the maximum size of the first map table may be based on the total capacity of the non-volatile memories. For example, when the total capacity of non-volatile memories 130 is 128 terabytes (TB) and the first map table follows a 4 kilobyte (KB) mapping scheme, the capacity of the memory 120 may be 128 gigabytes (GB). Also, when the total capacity of the non-volatile memories is 128 TB and the first map table follows the 16 KB mapping method, the capacity of the memory 120 may be 64 GB.

As at least one embodiment, the storage device 100 further includes input/output resources (not shown) for communication with the host device 20, and in a section where input/output resources (not shown) are not occupied by the first data input/output operation with the host device 20 using the non-volatile memories 130, the controller 110 may control the storage device 100 to perform a second data input/output operation with the host device 20 using the memory 120 in response to a request of the host device 20. Details on this will be described later with reference to FIG. 4.

In at least one embodiment, the mode management circuit 111 is configured to manage mode state information (indicating a current state related to the mode of the storage device 100), and to report mode state information to the host device 20 according to a request of the host device 20. The host device 20 may check the current mode state of the storage device 100 based on the reported mode state information and request the mode management circuit 111 to change the operation mode of the storage device 100.

As at least one embodiment, when the operation mode of the storage device 100 is changed from the first mode to the second mode, the mode management circuit 111 may move the first map table (used in the first mode) from the memory 120 to the non-volatile memories 130 and move the second map table and the second data (used in the second mode) from the non-volatile memories 130 to the memory 120, thereby enabling the storage device 100 to transition and operate smoothly in the second mode. Additionally, when the operation mode of the storage device 100 is changed from the second mode to the first mode, the mode management circuit 111 may move the second map table and second data (used in the second mode) from the memory 120 to the non-volatile memories 130, and move the first map table (used in the first mode) from the non-volatile memories 130 to the memory 120 so that the storage device 100 may smoothly operate in the first mode. In this specification, moving data from the memory 120 to the non-volatile memories 130 may also be referred to as flushing or backing-up, and the movement of data from non-volatile memories 130 to memory 120 may be referred to as restoring or loading.

Additionally, in at least some embodiments, moving data between memories may include a series of operations in which data stored in one memory is copied to another memory and the corresponding data stored in the one memory is deleted.

As at least one embodiment, the first map table, the second map table, and the second data may be stored in a certain (e.g., dedicated) area of the non-volatile memories 130, and the certain area may be managed by the mode management circuit 111.

As at least one embodiment, the controller 110 is configured to operate the non-volatile memories 130 as one of a single level cell (SLC), a multi-level cell (MLC), a triple level cell (TLC), a quadruple level cell (QLC), and/or the like. In some embodiments, when the non-volatile memories 130 operate as either TLC or QLC, the storage device 100 may operate in one of the first and second modes, and when the non-volatile memories 130 are operated as either SLC or MLC, the mode management circuit 111 may control the storage device 100 so that the storage device 100 operates only in the first mode. However, this is only one example, and the embodiments are not limited thereto. For example, in at least some examples, the embodiments may be applied without cell type limitation, and/or the embodiments may be applied only to the non-volatile memories 130 operated in a certain cell type.

The storage device 100 according to at least one embodiment may perform a first data input/output operation using the non-volatile memories 130 in a first mode to provide the memory space of non-volatile memories 130 to the host device 20, and may perform second data input/output operation using the memory 120 in the second mode to provide the memory space of the memory 120 to the host device 20. In at least one embodiment, when the first data input/output operation is not requested from the host device 20 within, e.g., a preset time period, the operation mode of the storage device 100 is changed from the first mode to the second mode, and the storage device 100 configured to respond to a request for a second data input/output operation from the host device 20. The memory 120 of the storage device 100 stores, in the first mode, a first map table (for a first memory input/output operation), and stores, in the second mode a second map table (for a second memory input/output operation) and second data (that is target data of the second memory input/output operation), such that utilization may be maximized. As a result, the storage device 100 may support the efficient use of the memory 120, and through this, the production cost of the storage device 100 may be reduced and the performance of the storage device 100 may be improved. Additionally, in at least one embodiment, wherein the second data is cold data, 'bit rot' of the second data, e.g., due to data degradation may be mitigated due to transfer of the second data during the changing from the first mode to the second mode, and back to the first mode, as described in further detail below.

Figure 2A:
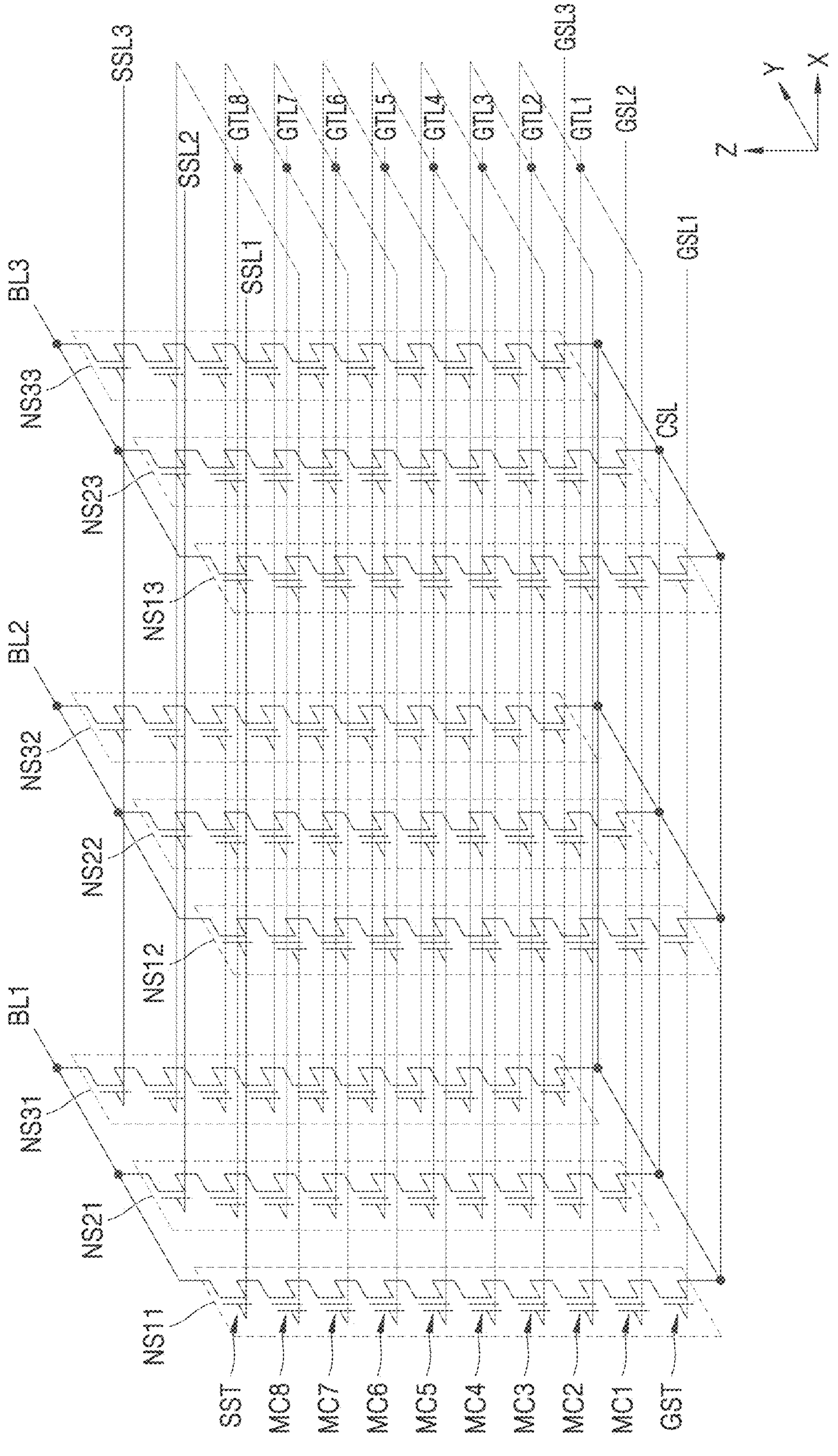
FIGS. 2A to 2C are diagrams for explaining a 3D V-NAND structure applicable to a storage device of FIG. 1.
Figure 2B:
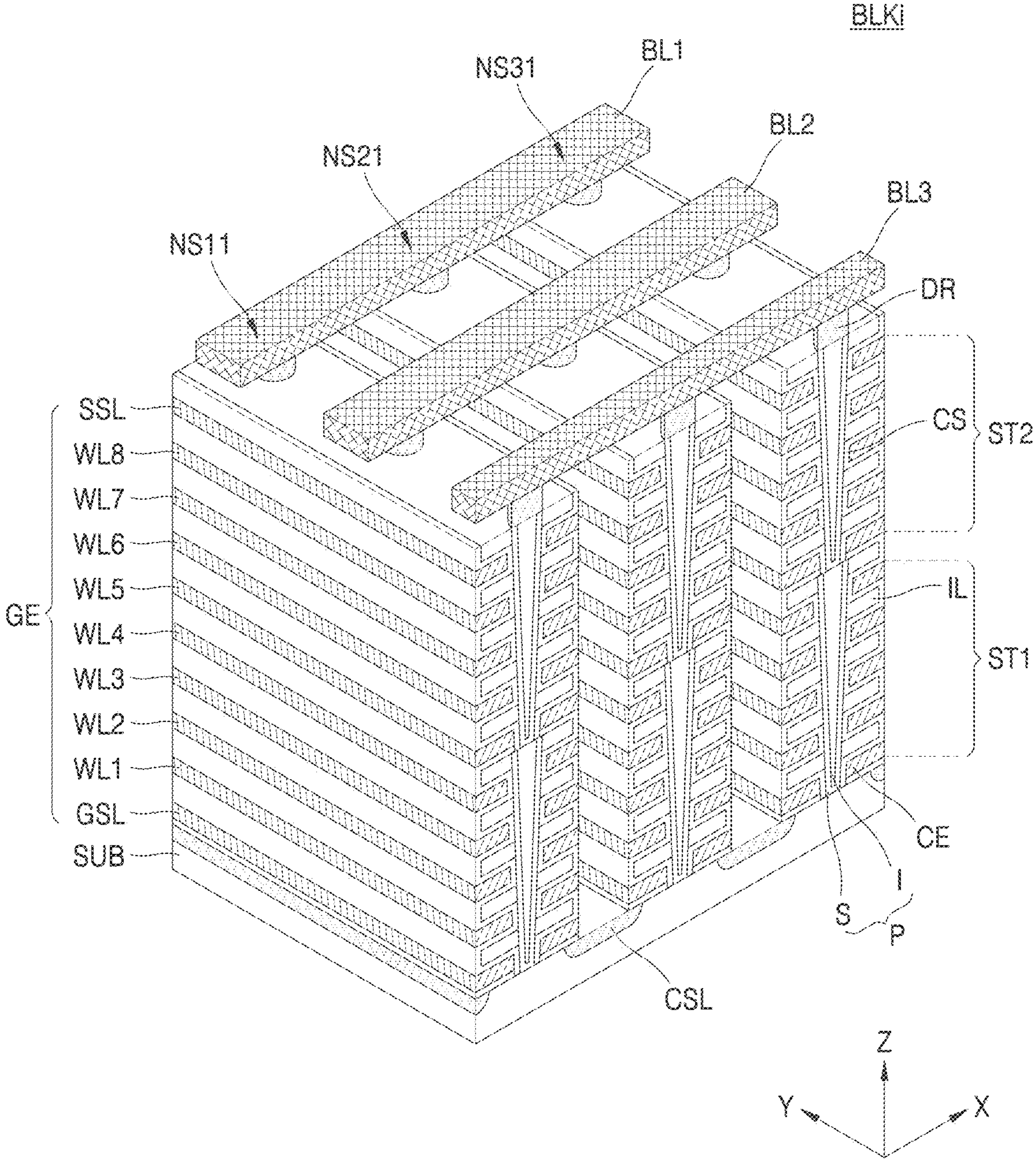
Figure 2C:
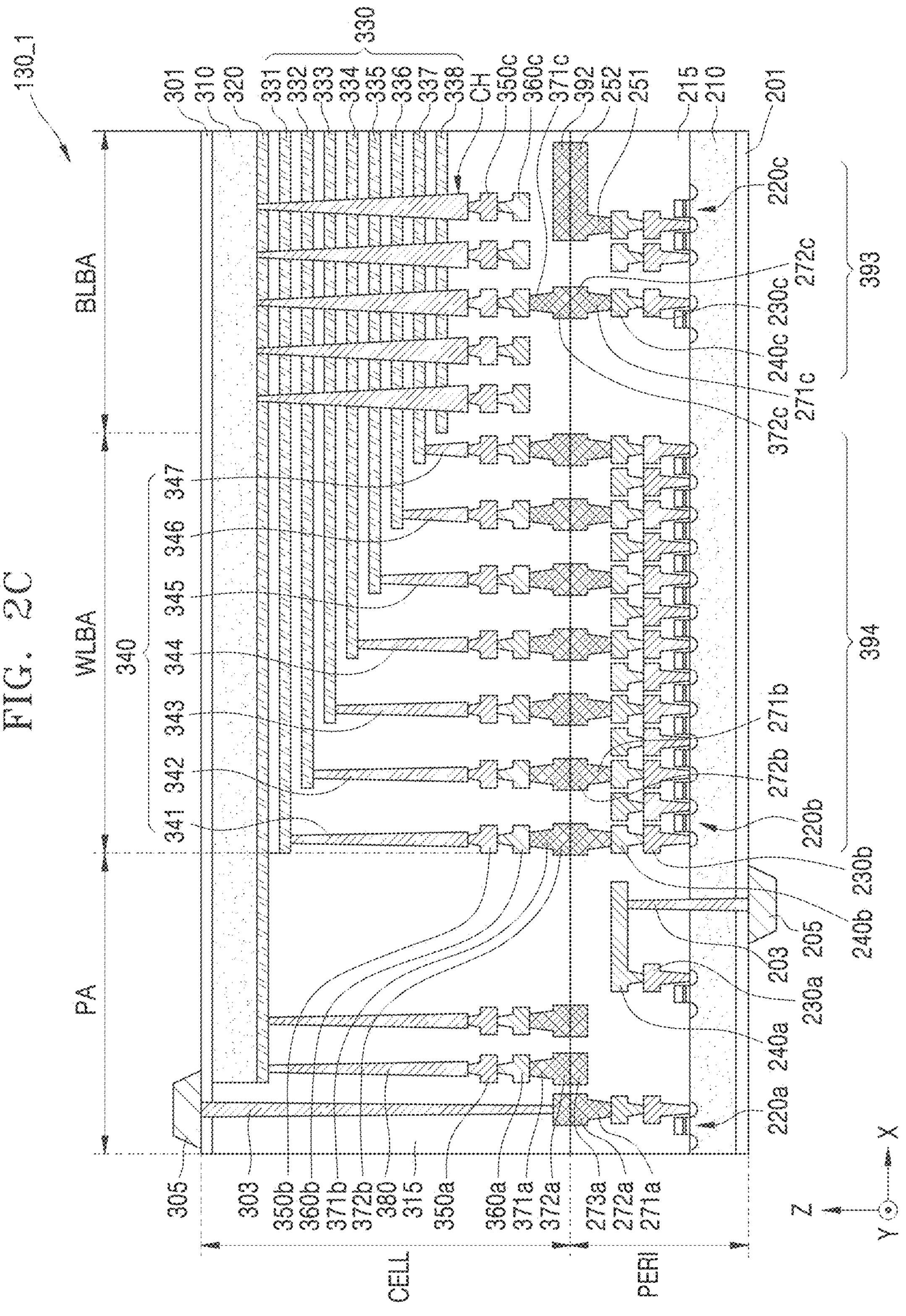

FIGS. 2A to 2C are diagrams for explaining a three-dimensional V-NAND structure applicable to the storage device 100 of FIG. 1. The non-volatile memories 130 of the storage device 100 (see FIG. 1) may include a plurality of memory blocks. FIGS. 2A and 2B illustrate the structure of one memory block BLKi among said plurality of memory blocks, and FIG. 2C describes the structure of the first non-volatile memory 130_1 (see FIG. 1).

Referring to FIG. 2A, the memory block BLKi may include a plurality of memory NAND strings NS11 to NS33 connected between a plurality of bit lines BL1, BL2, and BL3 and a common source line CSL. Each of the plurality of memory NAND strings NS11 to NS33 may include a string select transistor SST, a plurality of memory cells MC1 to MC8, and a ground select transistor GST. For brevity of the drawing, FIG. 2A shows that each of the plurality of memory NAND strings NS11 to NS33 includes eight memory cells MC1 to MC8, but the examples are not necessarily limited thereto.

The string selection transistor SST may be connected to corresponding string selection lines SSL1, SSL2, and SSL3. The plurality of memory cells MC1 to MC8 may be connected to corresponding gate lines GTL1 to GTL8, respectively. The gate lines GTL1 to GTL8 may correspond to word lines, and some of the gate lines GTL1 to GTL8 may correspond to dummy word lines. The ground selection transistor GST may be connected to corresponding ground selection lines GSL1, GSL2, and GSL3. The string selection transistor SST may be connected to corresponding bit lines BL1, BL2, and BL3, and the ground selection transistor GST may be connected to the common source line CSL.

The gate lines (e.g., GTL1) of the same height may be commonly connected, and the ground selection lines GSL1, GSL2, and GSL3 and the string selection lines SSL1, SSL2, and SSL3 may be separated from each other. In FIG. 2A, the memory block BLK is illustrated as being connected to eight gate lines GTL1 to GTL8 and three bit lines BL1, BL2, and BL3, but the examples are not necessarily limited thereto.

Further referring to FIG. 2B, the memory block BLKi is formed in a direction perpendicular to the substrate SUB. The memory cells constituting the memory NAND strings NS11 to NS33 are formed by stacking a plurality of semiconductor layers.

A common source line CSL extending along a first direction (Y direction) is provided on the substrate SUB. On the region of the substrate SUB between two adjacent common source lines CSL, a plurality of insulating films IL extending along a first direction (Y direction) may be sequentially provided along a third direction (Z direction), and the plurality of insulating films IL may be spaced apart by a certain distance along the third direction (Z direction). On the area of the substrate SUB between two adjacent common source lines CSL, sequentially disposed along the first direction (Y direction), and passing through a plurality of insulating films IL along the third direction (Z direction), a plurality of pillars P are provided. The plurality of pillars P may penetrate the plurality of insulating films IL to make contact with the substrate SUB. A surface layer S of each pillar P may include a silicon material doped with a first conductivity type, and may function as a channel region.

The inner layer I of each pillar P may include an insulating material, such as silicon oxide or an air gap. In a region between two adjacent common source lines CSL, a charge storage layer CS is provided along exposed surfaces of the insulating films IL, the pillars P, and the substrate SUB. The charge storage layer CS may include a gate insulating layer (also referred to as a 'tunneling insulating layer'), a charge trap layer, and a blocking insulating layer. Also, in a region between two adjacent common source lines CSL, gate electrodes GE such as selection lines GSL and SSL and word lines WL1 to WL8 are provided on the exposed surface of the charge storage layer CS. Drains or drain contacts DR may be provided on the plurality of pillars P, respectively. On the drain contacts DR, bit lines BL1 to BL3 extending in the second direction (X direction) and spaced apart from each other by a certain distance along the first direction (Y direction) may be provided.

As shown in FIGS. 2A and 2B, each of the memory NAND strings NS11 to NS33 may be implemented in a structure in which a first memory stack ST1 and a second memory stack ST2 are stacked. The first memory stack ST1 is connected to the common source line CSL, the second memory stack ST2 is connected to the bit lines BL1 to BL3, and the first memory stack ST1 and the second memory stack ST2 are stacked to share channel holes with each other.

Referring further to FIG. 2C, the first non-volatile memory 130_1 may have a chip to chip (C2C) structure. For example, the C2C structure may include an upper chip and a lower chip connected to each other by a bonding method after manufacturing the upper chip including the cell region CELL on a first wafer, and manufacturing the lower chip including the peripheral circuit region PERI on a second wafer. For example, the bonding method may refer to a method of electrically connecting the bonding metal formed in the uppermost metal layer of the upper chip and the bonding metal formed in the uppermost metal layer of the lower chip to each other. For example, when the bonding metal is formed of copper (Cu), the bonding method may be a Cu-Cu bonding method, and/or a hybrid bonding method. However, the examples are not limited thereto, and the bonding metal may also be formed of aluminum (Al), tungsten (W), and/or the like.

Each of the peripheral circuit area PERI and the cell area CELL of the first non-volatile memory device 130_1 may include an external pad bonding area PA, a word line bonding area WLBA, and a bit line bonding area BLBA.

The peripheral circuit area PERI may include a first substrate 210, an interlayer insulating layer 215, a plurality of circuit elements 220*a*, 220*b*, and 220*c* formed on the first substrate 210, a plurality of first metal layers 230*a*, 230*b*, and 230*c* respectively connected to the plurality of circuit elements 220*a*, 220*b*, 220*c*, and a plurality of second metal layers 240*a*, 240*b*, and 240*c* formed on the plurality of first metal layers 230*a*, 230*b*, and 230*c*. In one embodiment, the first metal layer 230*a*, 230*b*, and 230*c* may be formed of conductor (e.g., tungsten) having a relatively high electrical resistivity, and the second metal layers 240*a*, 240*b*, and 240*c* may be formed of a conductor (e.g., copper) having a relatively low electrical resistivity.

In FIG. 2C, only the first metal layers 230*a*, 230*b*, and 230*c* and the second metal layers 240*a*, 240*b*, and 240*c* are shown and described, but the examples are not limited thereto, and at least one more (or fewer) metal layer may be further formed on the second metal layers 240*a*, 240*b*, and 240*c*. At least a portion of the one or more metal layers formed on the second metal layer 240*a*, 240*b*, and 240*c* may be formed of aluminum having a lower electrical resistivity than copper forming the second metal layers 240*a*, 240*b*, and 240*c*.

In at least one embodiment, an interlayer insulating layer 215 is disposed on the first substrate 210 to cover the plurality of circuit elements 220*a*, 220*b*, and 220*c*, the first metal layers 230*a*, 230*b*, and 230*c*, and the second metal layers 240*a*, 240*b*, and 240*c*, and may include an insulating material such as silicon oxide, silicon nitride, and/or the like.

Lower bonding metals 271*b* and 272*b* may be formed on the second metal layer 240*b* of the word line bonding area WLBA. In the word line boding area WLBA, the lower bonding metals 271*b* and 272*b* of the peripheral circuit area PERI may be electrically connected to the upper bonding metals 371*b* and 372*b* of the cell area CELL by a bonding method, and the lower bonding metals 271*b* and 272*b* and the upper bonding metals 371*b* and 372*b* may be formed of aluminum, copper, tungsten, and/or the like.

The cell area CELL may provide at least one of the memory blocks. The cell area CELL may include a second substrate 310 and a common source line 320. A plurality of word lines 330 (e.g., 331 to 338) may be stacked on the second substrate 310 in a direction (Z-axis direction) perpendicular to the upper surface of the second substrate 310. String selection lines and ground selection lines may be disposed on each of the upper and lower portions of the word lines 330, and the plurality of word lines 330 may be disposed between the string selection lines and the ground selection line.

An area where the channel structure CH and the bit line 360*c* are disposed may be defined as a bit line bonding area BLBA. In the bit line bonding area BLBA, the channel structure CH may extend in a direction (Z-axis direction) perpendicular to the upper surface of the second substrate 310 to pass through the word lines 330, the string selection lines, and the ground selection line. The channel structure CH may include a data storage layer, a channel layer, and a buried insulating layer, and the channel layer may be electrically connected to the first metal layer 350*c* and the second metal layer 360*c*. For example, the first metal layer 350*c* may be a bit line contact, and the second metal layer 360*c* may be a bit line. In at least one embodiment, the bit line 360*c* may extend along a first direction (Y-axis direction) parallel to the upper surface of the second substrate 310.

The bit line 360*c* may be electrically connected to circuit elements 220*c* providing the page buffer 393 in a peripheral circuit area PERI in a bit line bonding area BLBA. For example, the bit line 360*c* may be connected to the upper bonding metals 371*c* and 372*c* in the peripheral circuit area PERI, and the upper bonding metals 371*c* and 372*c* may be connected to the lower bonding metals 271*c* and 272*c* connected to the circuit elements 220*c* of the page buffer 393.

In the word line bonding area WLBA, the word lines 330 may extend in a second direction (X-axis direction) perpendicular to the first direction and parallel to the top surface of the second substrate 310, and may be connected to a plurality of cell contact plugs 340 (e.g., 341 to 347 340). The word lines 330 and the cell contact plugs 340 may be connected to each other by pads provided by extending at least some of the word lines 330 to different lengths along the second direction. A first metal layer 350*b* and a second metal layer 360*b* may be sequentially connected to the upper portions of the cell contact plugs 340 connected to the word lines 330. The cell contact plugs 340 may be connected to a peripheral circuit area PERI through the upper bonding metals 371*b* and 372*b* of the cell area CELL and the lower bonding metals 271*b* and 272*b* of the peripheral circuit area PERI in the word line bonding area WLBA.

The cell contact plugs 340 may be electrically connected to circuit elements 220*b* providing the row decoder 394 in a peripheral circuit area PERI. In at least one embodiment, the operating voltages of the circuit elements 220*b* forming the row decoder 394 may be different from the operating voltages of the circuit elements 220*c* forming the page buffer 393. For example, the operating voltages of the circuit elements 220*c* forming the page buffer 393 may be greater than the operating voltages of the circuit elements 220*b* forming the row decoder 394.

A common source line contact plug 380 may be disposed in the outer pad bonding area PA. The common source line contact plug 380 is formed of a conductive material such as a metal, a metal compound, or polysilicon, and may be electrically connected to the common source line 320. A first metal layer 350*a* and a second metal layer 360*a* may be sequentially stacked on the common source line contact plug 380. For example, a region where the common source line contact plug 380, the first metal layer 350*a*, and the second metal layer 360*a* are disposed may be defined as an external pad bonding area PA.

Meanwhile, input/output pads 205 and 305 may be disposed in the outer pad bonding area PA. A lower insulating film 201 covering a lower surface of the first substrate 210 may be formed under the first substrate 210, and a first input/output pad 205 may be formed on the lower insulating film 201. The first input/output pad 205 may be connected to at least one of a plurality of circuit elements 220*a*, 220*b*, and 220*c* arranged in a peripheral circuit area PERI through a first input/output contact plug 203, and may be separated from the first substrate 210 by the lower insulating film 201. In addition, a side insulating film may be disposed between the first input/output contact plug 203 and the first substrate 210 to electrically separate the first input/output contact plug 203 from the first substrate 210.

An upper insulating film 310 covering the upper surface of the second substrate 310 may be formed on the second substrate 301, and a second input/output pad 305 may be disposed on the upper insulating film 301. The second input/output pad 305 may be connected to at least one of the plurality of circuit elements 220*a*, 220*b*, and 220*c* disposed in the peripheral circuit area PERI through the second input/output contact plug 303. In at least one embodiment, the second input/output pad 305 may be electrically connected to the circuit element 220*a*.

In some embodiments, the second substrate 310 and the common source line 320 may not be disposed in the area where the second input/output contact plug 303 is disposed. Also, in at least one embodiment, the second input/output pad 305 may not overlap the word lines 330 in the third direction (Z-axis direction). The second input/output contact plug 303 may be separated from the second substrate 310 in a direction parallel to the upper surface of the second substrate 310, and may be connected to the second input/output pad 305 through the interlayer insulating layer 315 of the cell area CELL.

According to some embodiments, the first input/output pad 205 and the second input/output pad 305 may be selectively formed. For example, the first non-volatile memory 130_1 may include only the first input/output pad 205 disposed on the first substrate 210, and/or may include only the second input/output pad 305 disposed on the second substrate 310. Alternatively, the first non-volatile memory 130_1 may include both the first input/output pad 205 and the second input/output pad 305.

In each of the outer pad bonding area PA and the bit line bonding area BLBA respectively included in the cell area CELL and the peripheral circuit area PERI, the metal pattern of the uppermost metal layer may exist as a dummy pattern, or the uppermost metal layer may be empty.

In relation to the first non-volatile memory device 130_1, a lower metal pattern 273*a* having the same shape as the upper metal pattern 372*a* of the cell area CELL may be formed on the uppermost metal layer of the peripheral circuit area PERI in correspondence to the upper metal pattern 372*a* formed on the uppermost metal layer of the cell area CELL in the outer pad bonding area PA. The lower metal pattern 273*a* formed on the uppermost metal layer of the peripheral circuit area PERI may not be connected to a separate contact in the peripheral circuit area PERI. Similarly, in correspondence to the lower metal pattern 273*a* formed in the uppermost metal layer of the peripheral circuit area PERI in the outer pad bonding area PA, an upper metal pattern 373*a* having the same shape as the lower metal pattern 273*a* of the peripheral circuit area PERI may be formed on the upper metal layer of the cell area CELL.

Lower bonding metals 271*b* and 272*b* may be formed on the second metal layer 240*b* of the word line bonding area WLBA. In the word line bonding area WLBA, the lower bonding metals 271*b* and 272*b* of the peripheral circuit area PERI may be electrically connected to the upper bonding metals 371*b* and 372*b* of the cell area CELL by a bonding method.

Also, in the bit line bonding area BLBA, in correspondence to the lower metal pattern 252 formed on the uppermost metal layer of the peripheral circuit area PERI, an upper metal pattern 392 having the same shape as the lower metal pattern 252 of the peripheral circuit area PERI may be formed on the uppermost metal layer of the cell area CELL. In at least one embodiment, the contact may not be formed on an upper metal pattern 392 formed on the uppermost metal layer of the cell area CELL.

Figure 3:
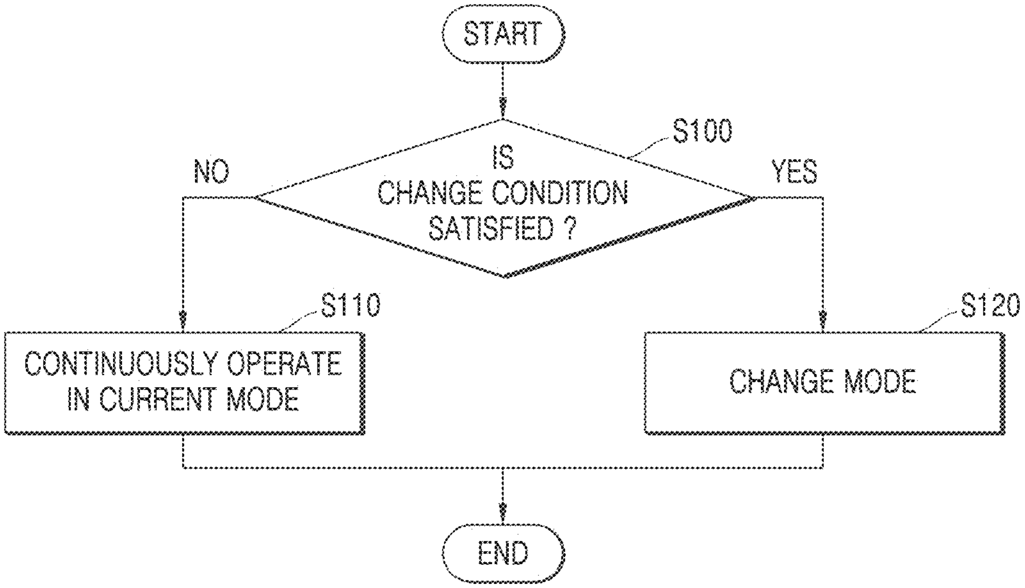
FIG. 3 is a flowchart illustrating an operating method of a storage device according to at least one embodiment.

FIG. 3 is a flowchart illustrating a method of operating a storage device according to at least one embodiment. The storage device may include volatile memory and non-volatile memory. For example, volatile memory may be implemented with DRAM, and non-volatile memories may be implemented with flash memory.

Referring to FIG. 3, at operation S100, the storage device may determine whether a change condition for changing the current mode to another mode is satisfied. For example, in at least one embodiment, the storage device may determine whether a first change condition for changing to the second mode is satisfied when the current mode is the first mode; and/or the storage device may determine whether a second change condition for changing to the first mode is satisfied when the current mode is the second mode. The first change condition and the second change condition may be the same and/or different conditions.

When operation S100 is 'NO', the storage device may continue to operate in the current mode following operation S110. As an example, the storage device may perform a first data input/output operation using non-volatile memories in response to a request from the host device when the current mode is the first mode and the storage device may perform a second data input/output operation using the volatile memory in response to a request from the host device when the current mode is the second mode.

When operation S100 is 'YES', following operation S120, the storage device may change the current mode to the other mode. For example, in at least one embodiment, the storage device may determine that operation S100 is 'YES' in response to receiving a mode change command, a preset time period expiring, and/or a data input/output operation request of the other mode while being in a mode changeable state, as described in further detail below.

In least one embodiment, when changing the operation mode from the first mode to the second mode, the storage device may move the first map table (used in the first mode) from volatile memory to non-volatile memories and may move the second map table (used in the second mode) and second data (which is target data of a second data input/output operation) from non-volatile memories to volatile memories. When changing the operation mode from the second mode to the first mode, the storage device may move the second map table and the second data (used in the second mode) from the volatile memory to the non-volatile memories and may move the first map table (used in the first mode) from non-volatile memories to volatile memories. In some embodiments, the storage device may continuously store the second map table in the volatile memory in the first and second modes. An example embodiment for this will be described later with reference to FIGS. 10A to 11B.

Figure 4:
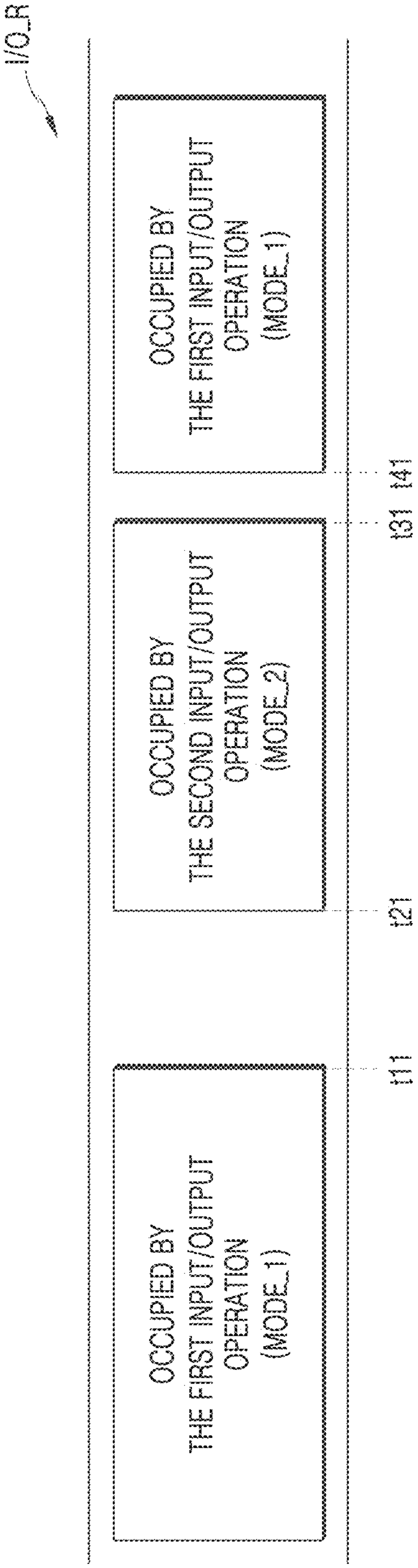
FIG. 4 is a diagram for describing an operation of a storage device, based on input/output resources, according to at least one embodiment.

FIG. 4 is a diagram for describing an operation of a storage device according to at least one embodiment based on input/output resources I/O_R.

Referring to FIG. 4, a storage device may include input/output resources I/O_R for communication with a host device. The input/output resources I/O_R include, e.g., interfaces, wires, and buses used for transmitting and receiving signals with the host device, and some of the input/output resources I/O_R may be placed between the storage device and the host device.

As at least one embodiment, the input/output resources I/O_R may be occupied by the first data input/output operation of the storage device in the first mode MODE_1 until time 't11'. That is, the storage device may communicate with the host device using non-volatile memories until time 't11'. In the section between time 't11' and time 't41' when the input/output resources I/O_R are not occupied by the first data input/output operation, the storage device changes the operation mode from the first mode MODE_1 to the second mode MODE_2, and the Input/output resources I/O_R may be occupied for a time period of 't21' to 't31' by a second data input/output operation of the storage device according to a request of the host device.

As at least one embodiment, the storage device may determine a section in which input/output resources I/O_R are not occupied by the first data input/output operation, and perform the second data input/output operation by changing the operation mode from the first mode MODE_1 to the second mode MODE_2 based on the determination result. As at least one embodiment, when not receiving a request for a first data input/output operation from the host device in the first mode MODE_1 for a preset (and/or otherwise determined) time after time 't11', the storage device may determine that the section starts.

As at least one embodiment, at time 't41' or before time 't41' when the input/output resources I/O_R are occupied again by the first data input/output operation, the storage device may change the operation mode from the second mode MODE_2 to the first mode MODE_1.

A storage device according to at least one embodiment performs a second data input/output operation in a section in which input/output resources I/O_R are not occupied by the first data input/output operation, such that the second data input/output operation may be effectively performed by increasing utilization of input/output resources I/O_R without interfering with the first data input/output operation. Accordingly, the volatile memory performing an auxiliary role of storing the first map data necessary for the first data input/output operation may be effectively used through the second data input/output operation, and as a result, the capacity of the volatile memory usable in the host device may be additionally secured.

Figure 5:
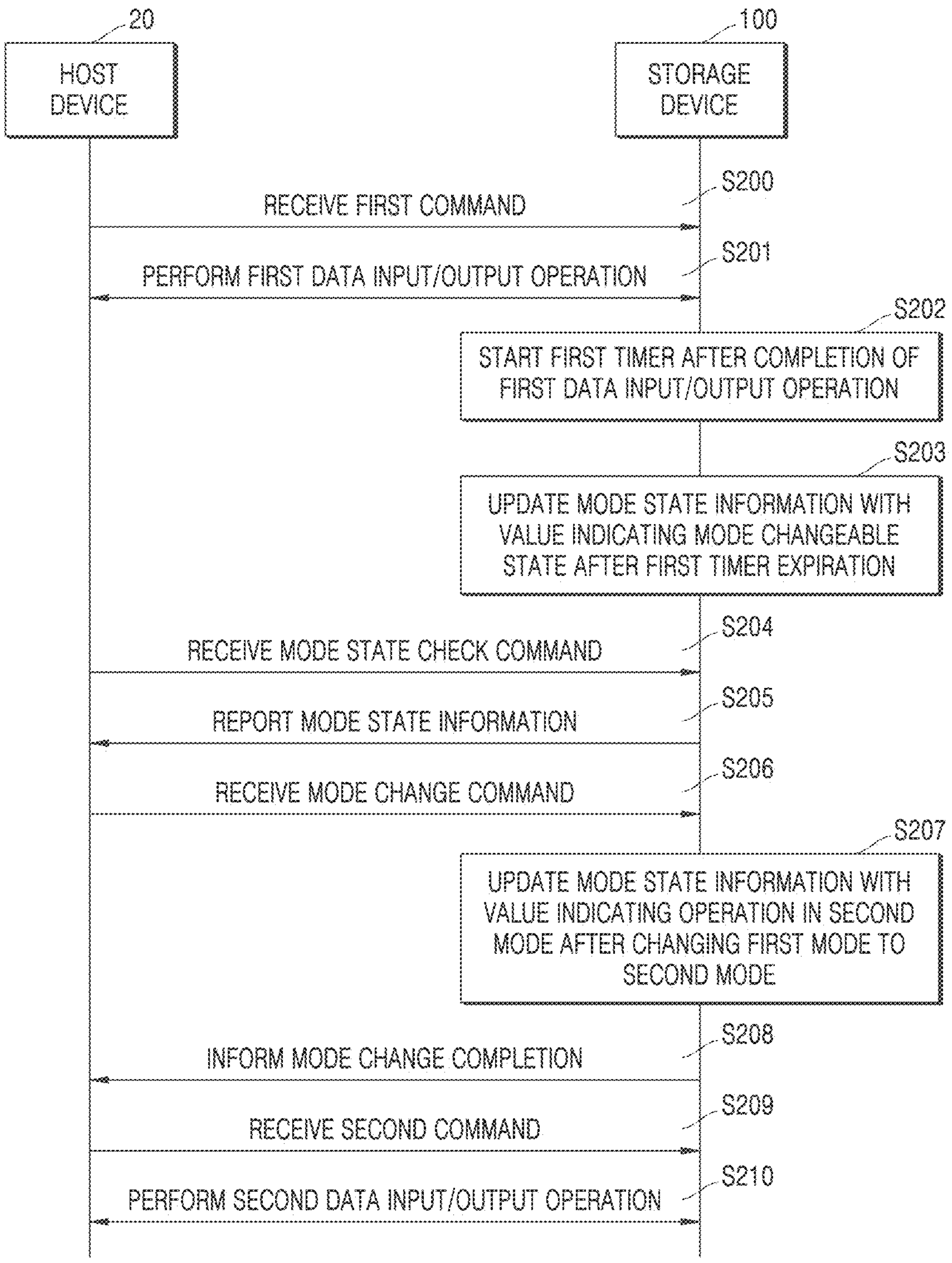
FIG. 5 is a flowchart illustrating an operating method of an electronic device according to at least one embodiment.

FIG. 5 is a flowchart illustrating a method of operating an electronic device according to at least one embodiment. The electronic device may include a host device 20 and a storage device 100. In FIG. 5, a method of operating an electronic device based on the storage device 100 side is described.

Referring to FIG. 5, in operation S200, the storage device 100 may receive a first command from the host device 20. For example, the first command may be or include a command for the host device 20 to request a first data input/output operation from the storage device 100.

At operation S201, the storage device 100 may perform a first data input/output operation using the host device 20 and non-volatile memories in a first mode.

At operation S202, the storage device 100 may start a first timer after the first data input/output operation is completed. The first timer may be reset when a request for the first data input/output operation is received from the host device 20.

At operation S203, the storage device 100 may update mode state information with a value indicating a mode changeable state after the first timer expires. As at least one embodiment, the mode state information is information reported to the host device 20 and may indicate whether the storage device 100 is in a first mode, a second mode, or a mode changeable state. Details on this will be described later with reference to FIG. 6B.

At operation S204, the storage device 100 receives a mode state check command from the host device 20. For example, the mode state check command is (or includes) a command requesting reporting of mode state information of the storage device 100 and may conform to, e.g., a 'get feature' command defined in the NVM Express standard specification. For example, the host device 20 may generate a mode state check command using 'Reserved' fields in the get feature command format.

At operation S205, the storage device 100 reports the mode state information to the host device 20 in response to the mode state check command. For example, at operation S203, the mode state information is updated to a value indicating a mode changeable state, and the updated mode state information may be reported to the host device 20 at operation S205.

In operation S206, the storage device 100 may receive a mode change command from the host device 20. As at least one embodiment, the host device 20 may check that the storage device 100 is currently in a changeable state from the first mode to the second mode based on the mode state information, and accordingly, transmit a mode change command to the storage device 100. As at least one embodiment, the mode change command is, or includes, a command for requesting a mode change of the storage device 100 and may conform, e.g., to a 'set feature' command defined in the NVM Express standard specification. Specifically, the host device 20 may generate a mode change command using 'Reserved' fields in the set feature command format.

At operation S207, the storage device 100 updates the mode state information with a value indicating that the operation mode is operated in the second mode after changing the operation mode from the first mode to the second mode.

At operation S208, the storage device 100 informs the host device 20 of the completion of the mode change.

At operation S209, the storage device 100 receives a second command from the host device 20. For example, the second command may be (and/or include) a command for the host device 20 to request a second data input/output operation to the storage device 100.

At operation S210, the storage device 100 performs a second data input/output operation using the host device 20 and the volatile memory 120.

FIG. 6A is a table diagram for describing a get feature command or a set feature command according to at least one embodiment, and FIG. 6B is a table diagram for describing mode state information according to at least one embodiment.

Referring to FIG. 6A, as in the first table TB1, the get feature command may be a command for acquiring at least one related feature from among the logical block addressing range type ('LBA Range Type') related features, 'Error Recovery' related features, 'Write Atomicity Normal' related features, 'LBA Status Information Report Interval' related features, and 'Mode Management' related features, from the storage device. In addition, the set feature command may be a command for setting at least one related feature among the 'LBA Range Type' related features, 'Error Recovery' related features, 'Write Atomicity Normal' related features, 'LBA Status Information Report Interval' related features, and 'Mode Management' related features.

As at least one embodiment, at least one of 'LBA Range Type' related features, 'Error Recovery' related features, 'Write Atomicity Normal' related features, LBA Status Information Report Interval' related features, and 'Mode Management' related features may be identified from the host device and the storage device by assigning first to fifth identifiers ID1 to ID5, respectively.

Referring further to FIG. 5, the host device 20 may transmit a get feature command including a fifth identifier ID5 to the storage device 100 to request a report on mode state information indicating characteristics related to 'Mode Management' from the storage device 100. In addition, the host device 20 may transmit a set feature command including a fifth identifier ID5 to the storage device 100 to request the storage device 100 to change the operation mode from the first mode to the second mode.

Further referring to FIG. 6B, as in the second table TB2, the mode state information may include a first value V1 indicating that the storage device operates in a first mode, a second value V2 indicating that the first mode may be changed to the second mode, and/or a third value V3 indicating that the second mode is operated.

The storage device may report mode state information to the host device. The host device may check the current state of the storage device based on the mode state information, and request a mode change of the storage device based on the check result.

However, the mode state information of FIG. 6B is only an example, and the embodiments are not limited thereto, and, for example, a fourth value indicating that the second mode may be changed to the first mode may be further included.

Figure 7A:
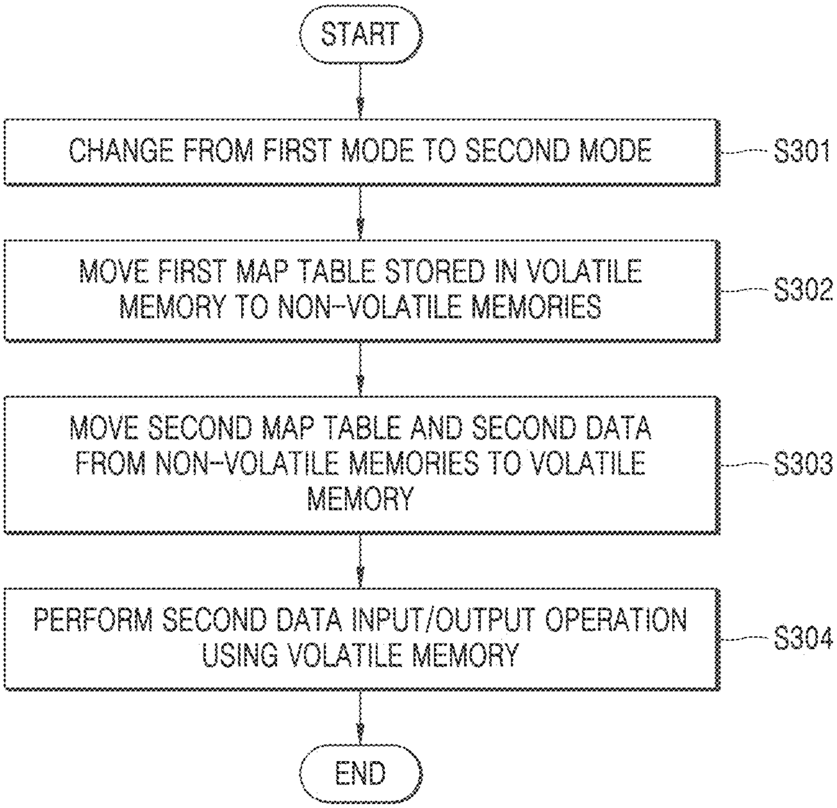
FIGS. 7A and 7B are flowcharts illustrating an operating method of a storage device according to at least one embodiment.
Figure 7B:
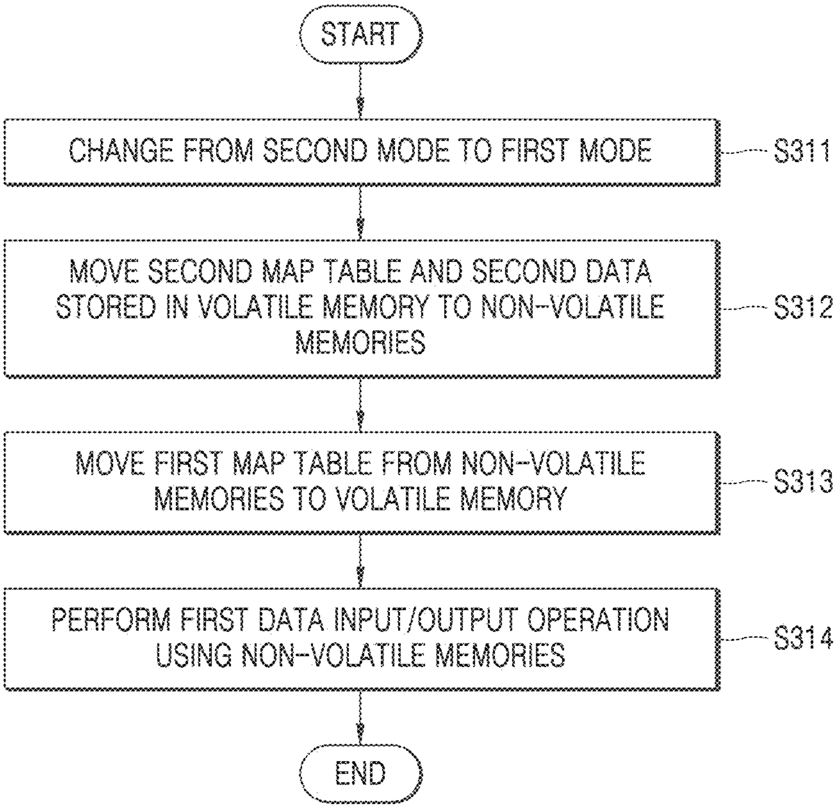

FIGS. 7A and 7B are flowcharts illustrating a method of operating a storage device according to at least one embodiment.

Referring to FIG. 7A, at operation S301, the storage device changes an operation mode from the first mode to the second mode.

At operation S302, the storage device moves the first map table stored in the volatile memory to non-volatile memories. As described above, the first map table is used in the first mode and is unnecessary in the second mode, and thus, the storage device may move the first map table (occupying some space of the volatile memory) to non-volatile memories and delete the first map table from the volatile memory, thereby freeing the space. In at least one example, the storage device may manage first physical addresses of a first space of non-volatile memories in which a first map table is stored.

At operation S303, the storage device moves the second map table and the second data from the non-volatile memories to the volatile memory. As described above, the second map table is used in the second mode and may be loaded into a volatile memory, and the second data may be data that is a target of a second data input/output operation. As an example, the storage device may manage second physical addresses of second spaces of non-volatile memories in which the second map table and the second data are stored. In some embodiments, the storage device may store the second map table in the volatile memory regardless of the mode and move only the second data according to the mode. In these cases, in operation S303, the storage device may move only the second data from the non-volatile memories to the volatile memory.

In operation S304, the storage device performs a second data input/output operation using the volatile memory. In at least one embodiment, the storage device may access the volatile memory using the second map table according to a request from the host device, and read second data from the volatile memory or write new second data to the volatile memory. The storage device may update the second map table and the second data by performing a second data input/output operation.

Referring further to FIG. 7B, at operation S311, the storage device changes from the second mode to the first mode.

At operation S312, the storage device moves the second map table and the second data stored in the volatile memory to non-volatile memories. As described above, since the second map table and the second data are used in the second mode and are unnecessary in the first mode, the second map table and the second data occupying a part of the space of the volatile memory may be moved to the non-volatile memories, thereby freeing up the space. In some embodiments, the storage device may move second data stored in the volatile memory to non-volatile memories, and the second map table may maintain storage in the volatile memory. For example, the storage device may store the second map table in the volatile memory regardless of the mode.

At operation S313, the storage device moves the first map table from non-volatile memories to volatile memory. As described above, the first map table may be loaded into volatile memory as to be used in the first mode.

At operation S314, the storage device performs a first data input/output operation using non-volatile memories. In at least one embodiment, the storage device may access the non-volatile memories using the first map table according to a request from the host device, and may read first data from the non-volatile memory or write new first data to the non-volatile memories. The storage device may update the first map table and the first data by performing a first data input/output operation.

Figure 8:
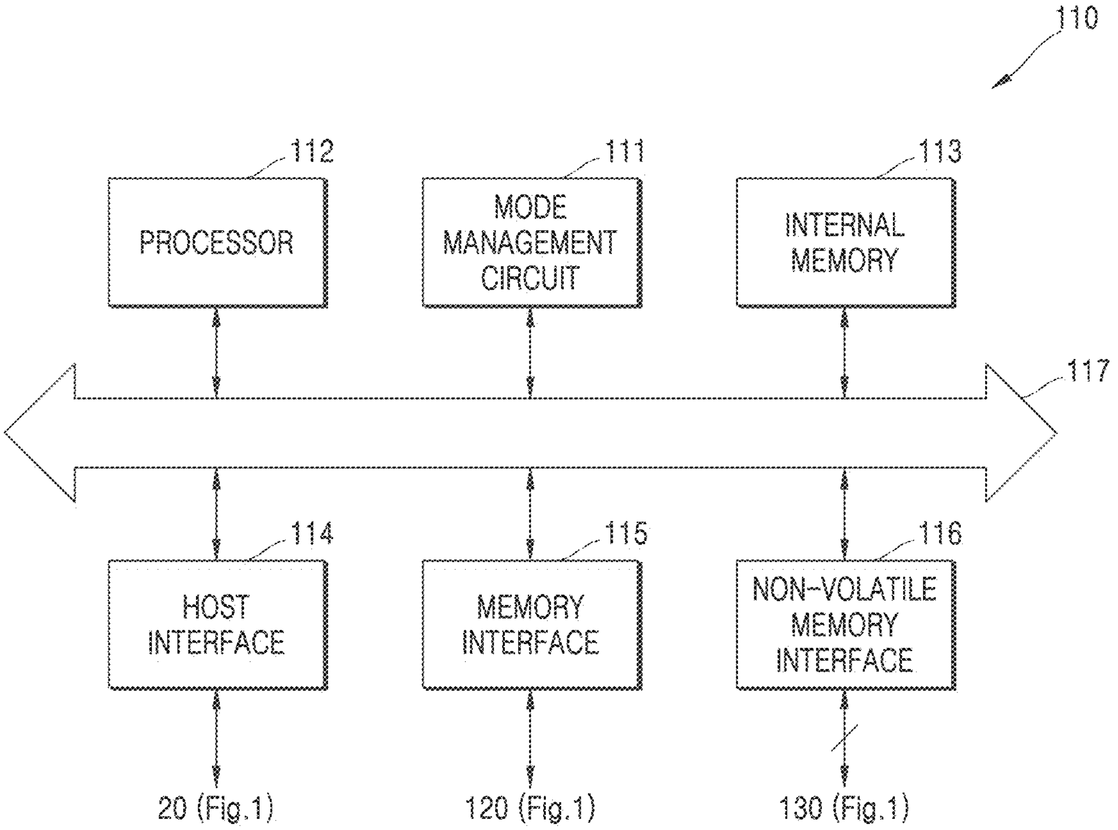
FIG. 8 is a block diagram showing a controller of FIG. 1 in detail.

FIG. 8 is a block diagram showing the controller 110 of FIG. 1 in detail.

Referring to FIG. 8, the controller 110 may include a mode management circuit 111, a processor 112, an internal memory 113, a host interface 114, a memory interface 115, a non-volatile memory interface 116, and a bus 117. The mode management circuit 111, the processor 112, the internal memory 113, the host interface 114 and the memory interface 115, and the non-volatile memory interface 116 are configured to perform internal communication through the bus 117.

In at least one embodiment, the mode management circuit 111 may be implemented in processing circuitry, and the processor 112 may include a central processing unit (CPU), an arithmetic logic unit (ALU), a digital signal processor, a field programmable gate array (FPGA), a System-on-Chip (SoC), a programmable logic unit, a microprocessor, and/or the like.

The processor 112 is configured to control the overall operation of the controller 110. The processor 112 may perform operations by executing the mode management circuit 111 implemented as software and loaded into the internal memory 113.

The internal memory 113 is configured to operate under the control of the processor 112 and may be used as an operating memory, a buffer memory, a cache memory, and/or the like. A flash translate layer (FTL) may be loaded into the internal memory 113, and the FTL may include firmware. According to functions implemented by firmware, the FTL may further include a wear-leveling module, a bad block management module, a garbage collection module, an encryption/decryption module, a mapping table management module, and/or the like. In at least one embodiment, the first map table and the second map table may be created and managed by the mapping table management module. In some embodiments, the second map table may be created and managed by a control logic of a volatile memory.

The host interface 114 may provide an interface between the host device 20 (see FIG. 1) and the controller 110. The memory interface 115 may provide an interface between the memory 120 (see FIG. 1) and the controller 110. The non-volatile memory interface 116 may provide an interface between the non-volatile memories 130 (see FIG. 1) and the controller 110.

As at least one embodiment, the mode management circuit 111 may control a mode change of the storage device 100 (see FIG. 1) and movement of data used in the changed mode using the memory interface 115, the non-volatile memory interface 116, and the bus 117.

As at least one embodiment, when the storage device 100 (see FIG. 1) operates in the first mode, the mode management circuit 111 may transmit the first data received through the host interface 114 from the host device 20 (see FIG. 1) to the non-volatile memories 130 (see FIG. 1) through the non-volatile memory interface 116 and the bus 117, and may transmit the first data received through the non-volatile memory interface 116 from the non-volatile memories 130 (see FIG. 1) to the host device 20 (see FIG. 1) through the host interface 114 and the bus 117.

As at least one embodiment, when the storage device 100 (see FIG. 1) operates in the second mode, the mode management circuit 111 may transmit the second data received through the host interface 114 from the host device 20 (see FIG. 1) to the memory 120 (see FIG. 1) through the memory interface 115 and the bus 117, and may transmit the second data received through the memory interface 115 from the memory 120 (see FIG. 1) to the host device 20 (see FIG. 1) through the host interface 114 and the bus 117.

Figure 9A:
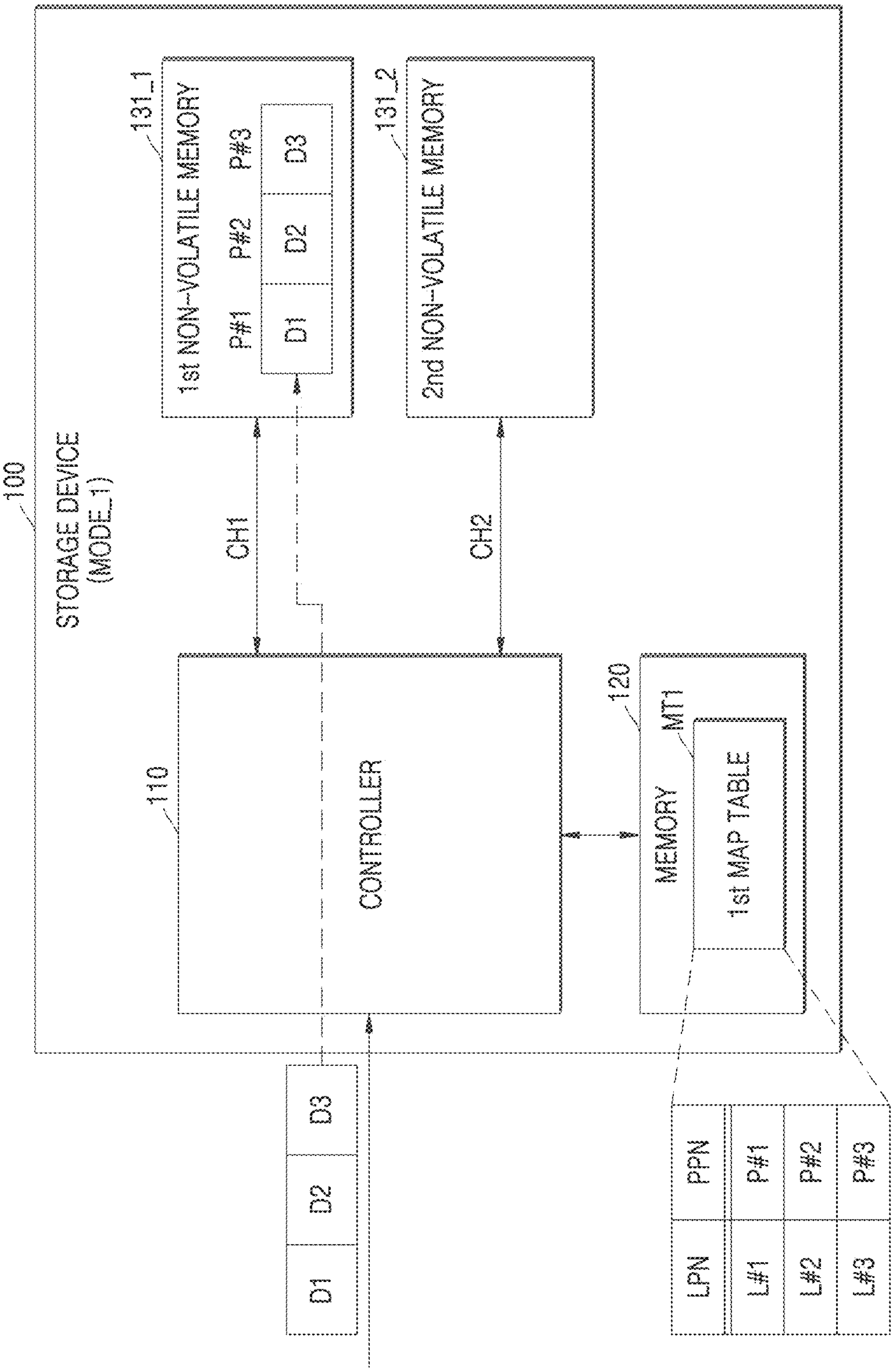
FIGS. 9A to 9C are block diagrams for describing operations of a storage device according to at least one embodiment in detail.
Figure 9B:
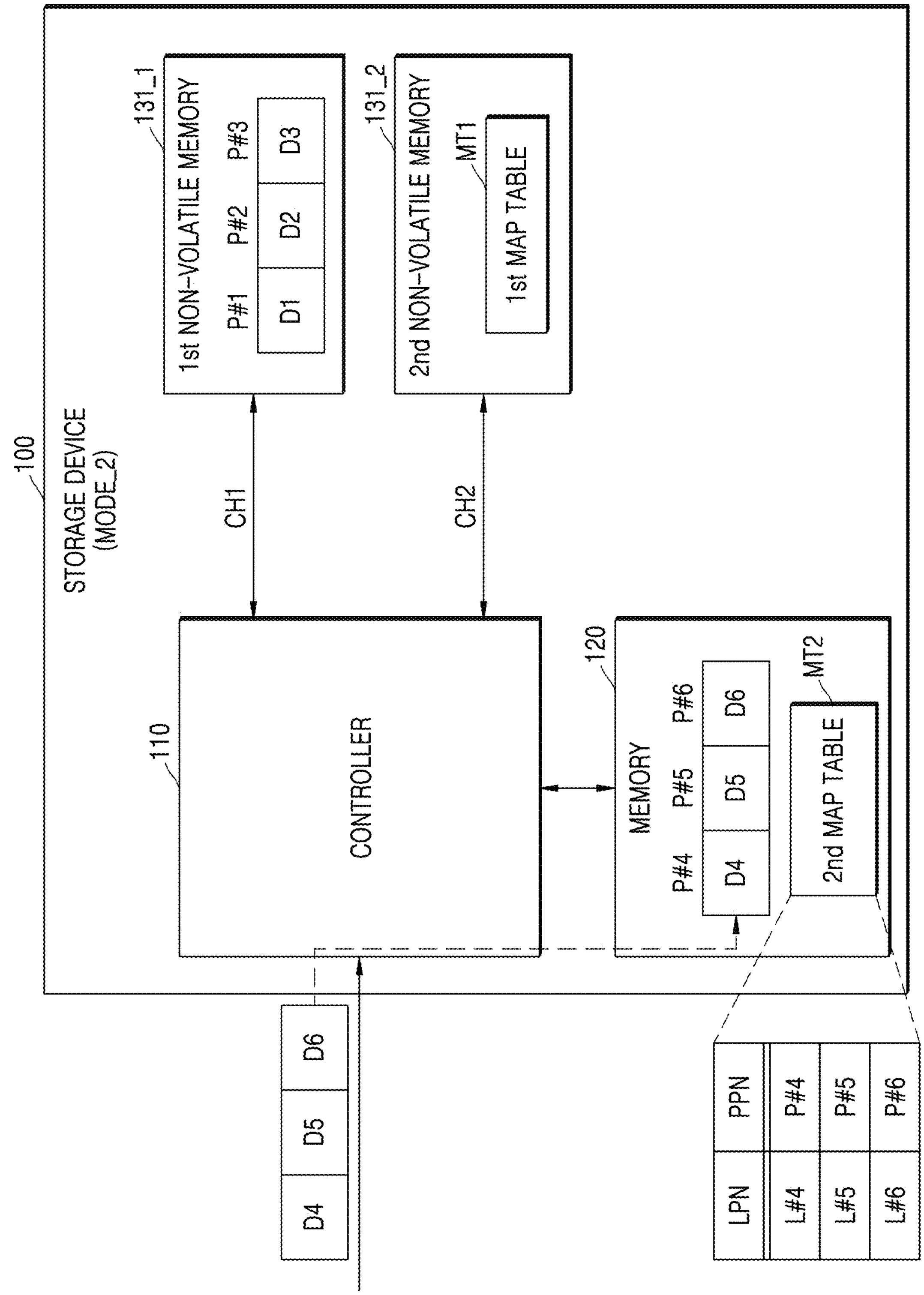
Figure 9C:
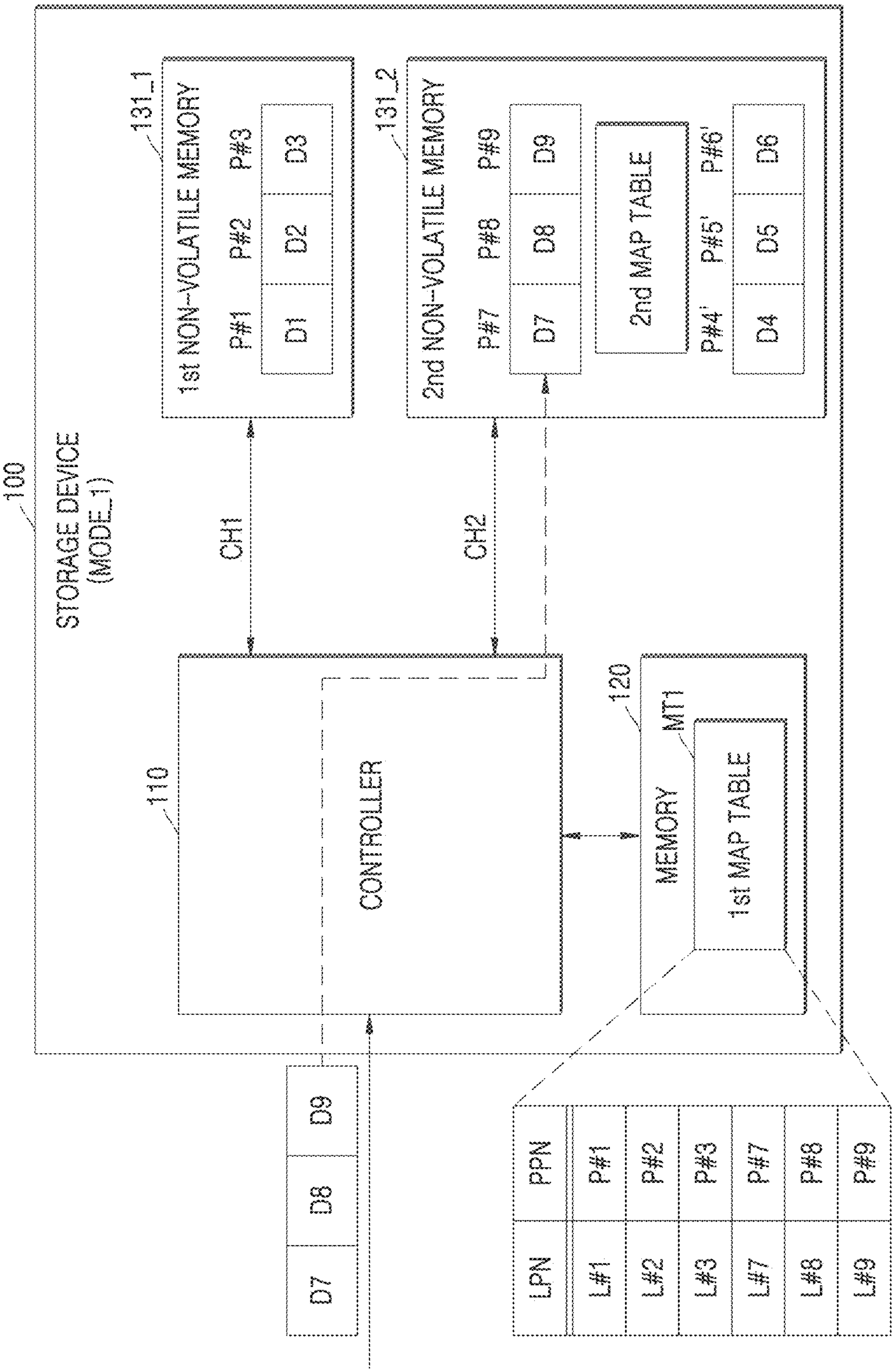

FIGS. 9A to 9C are block diagrams for describing operations of the storage device 100 according to at least one embodiment in detail. It the following description, the storage device 100 in FIGS. 9A and 9C operates in the first mode MODE_1, and the storage device 100 in FIG. 9B operates in the second mode MODE_2. In addition, overlapping contents of FIGS. 9A to 9C are omitted.

Referring to FIG. 9A, the storage device 100 may include a controller 110, a memory 120, a first non-volatile memory 131_1, and a second non-volatile memory 131_2. The first non-volatile memory 131_1 may communicate with the controller 110 through a first channel CH1, and the second non-volatile memory 131_2 may communicate with the controller 110 through a second channel CH2.

The controller 110 may receive first data including 'D1' to 'D3' from the host device 20 (see FIG. 1). The controller 110 may write 'D1' to 'D3' to the first non-volatile memory 131_1 by referring to the first map table MT1 stored in the memory 120. As an example, the first map table MT1 may indicate a mapping relationship between the logical page number (LPN) of the host device 20 (see FIG. 1) and the physical page number (PPN) of the non-volatile memories 131_1 and 131_2.

The controller 110 maps 'L #1' to 'L #3', which are logical addresses received from the host device 20 (see FIG. 1) together with 'D1' to 'D3', to 'P #1' to 'P #3' to update the first map table MT1. The controller 110 may write 'D1' to 'D3' to areas corresponding to 'P #1' to 'P #3' of the first non-volatile memory 131_1.

Referring further to FIG. 9B, the storage device 100 may change from the first mode MODE_1 to the second mode MODE_2 and operate. The controller 110 may move the first map table MT1 stored in the memory 120 in FIG. 9A to the second non-volatile memory 131_2. The memory 120 may use the space where the first map table MT1 was stored as a space for storing second data or the second map table MT2 to be described below.

The controller 110 may receive second data including 'D4' to 'D6' from the host device 20 (see FIG. 1). The controller 110 may write 'D4' to 'D6' into the memory 120 by referring to the second map table MT2 stored in the memory 120. For example, the second map table MT2 may indicate a mapping relationship between the logical page number (LPN) of the host device 20 (see FIG. 1) and the physical page number (PPN) of the memory 120. The controller 110 maps 'L #4' to 'L #6', which are logical addresses received from the host device 20 (see FIG. 1) together with D4' to 'D6', to 'P #4' to 'P #6', to update the second map table MT2. The controller 110 may write 'D4' to 'D6' in areas corresponding to 'P #4' to 'P #6' of the volatile memory 120.

Further referring to FIG. 9C, the storage device 100 may operate after being changed from the second mode MODE_2 to the first mode MODE_1. The controller 110 may move the second map table MT2 and 'D4' to 'D6' stored in the memory 120 in FIG. 9B to the second non-volatile memory 131_2. The controller 110 may move the first map table MT1 stored in the memory 120 in FIG. 9A to the second non-volatile memory 131_2.

The controller 110 may receive first data including 'D7' to 'D9' from the host device 20 (see FIG. 1). The controller 110 may write 'D7' to 'D9' to the second non-volatile memory 131_2. The controller 110 maps 'L #7' to 'L #9', which are logical addresses received from the host device 20 (see FIG. 1) together with 'D7' to 'D9', to 'P #7' to 'P #9', to update the first map table MT1. The controller 110 may write 'D7' to 'D9' in areas corresponding to 'P #7' to 'P #9' of the second non-volatile memory 131_2.

However, it will be fully understood that FIGS. 9A to 9C are only embodiments for helping to understand the inventive concepts, and the embodiments are not limited thereto.

Figure 10A:
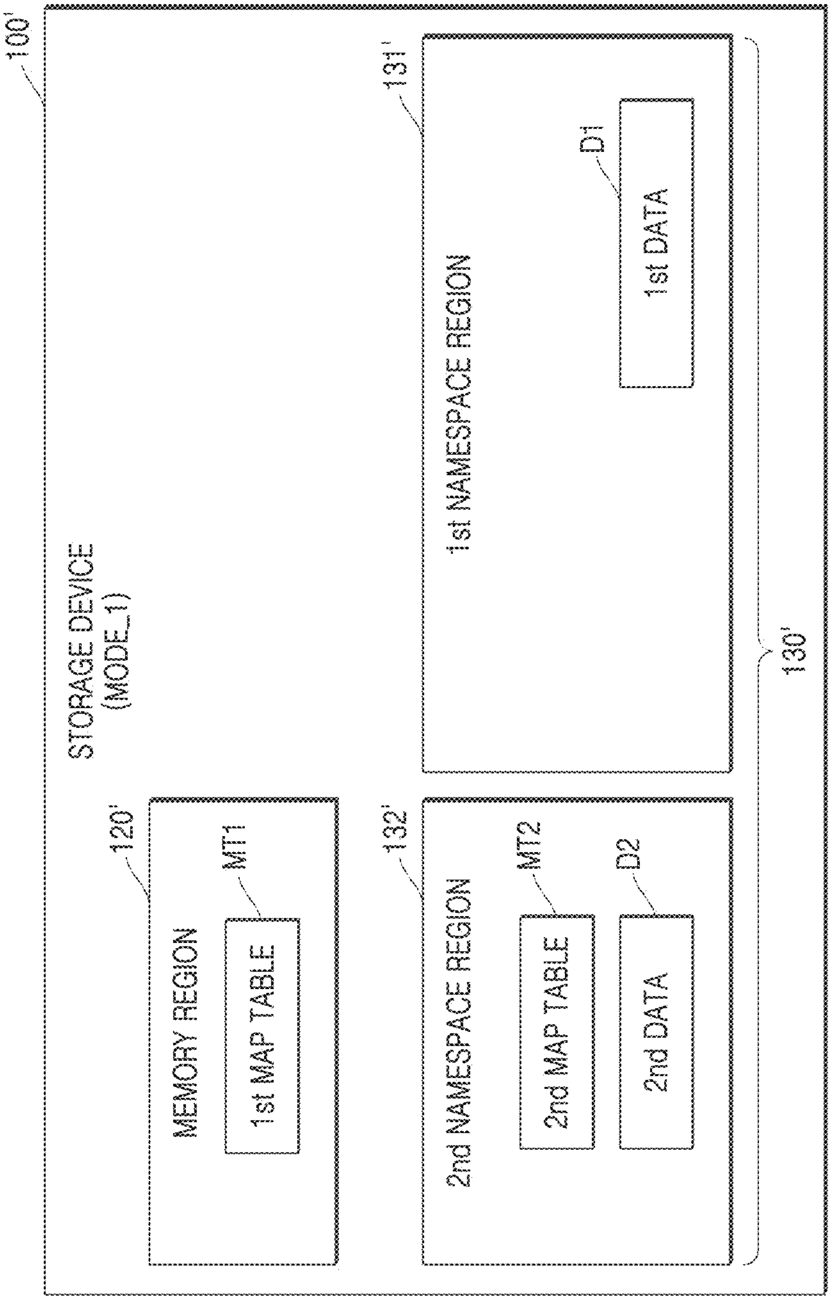
FIGS. 10A and 10B are block diagrams for describing operations of a storage device 100' according to at least one embodiment in detail.
Figure 10B:
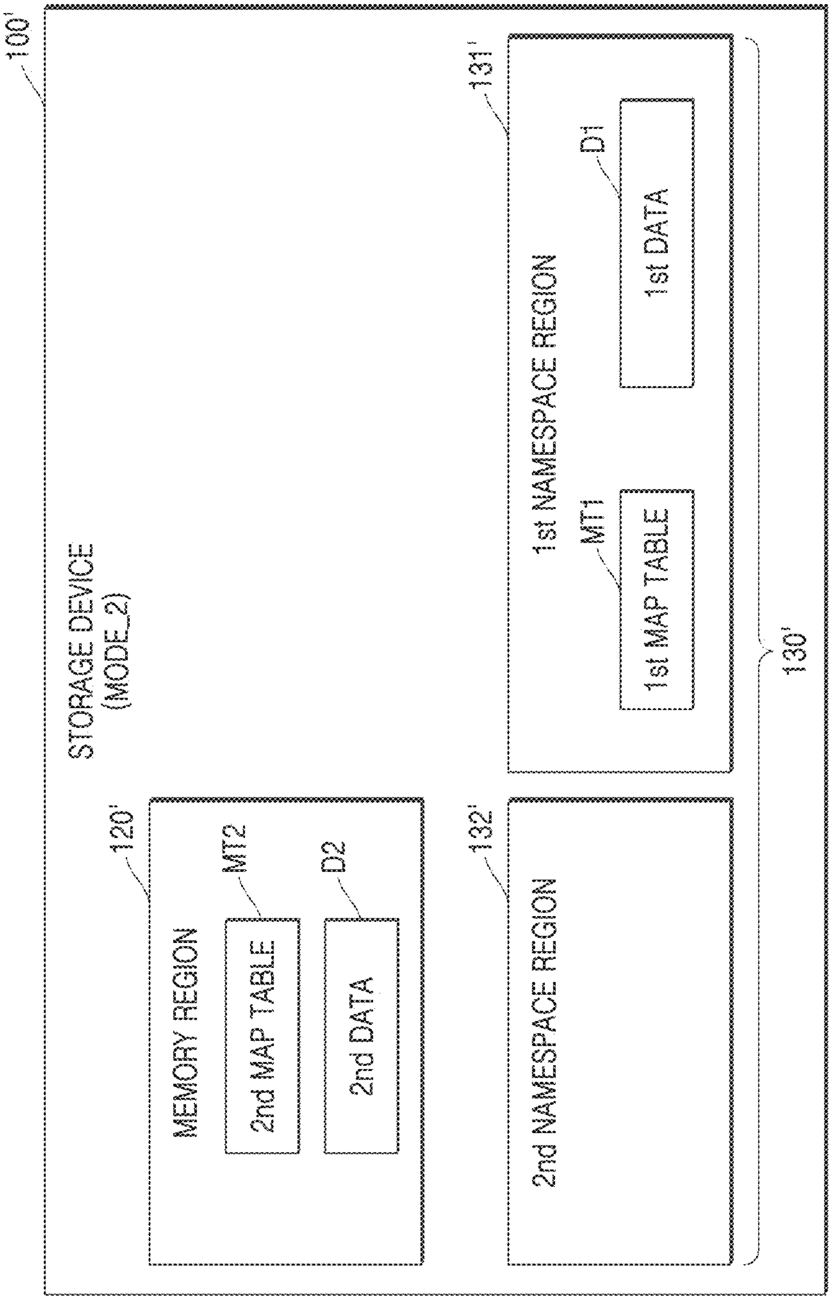

FIGS. 10A and 10B are block diagrams for describing operations of the storage device 100' according to at least one embodiment in detail. In FIG. 10A, it is assumed that the storage device 100' operates in the first mode MODE_1, and in FIG. 10B, the storage device 100' operates in the second mode MODE_2.

Referring to FIG. 10A, the storage device 100' may include a memory region 120', a first namespace region 131', and a second namespace region 132'. The memory region 120' may correspond to the memory 120 of FIG. 1, and the first and second namespace regions 131' and 132' may correspond to the non-volatile memories 130 of FIG. 1. Specifically, the non-volatile memories 130 of FIG. 1 may provide non-volatile memory regions divided as at least first and second namespace regions 131' and 132' to the host device 20 of FIG. 1. In at least one embodiment, the first namespace region is an area where data (e.g., the first map table MT1 and/or the first data D1) corresponding to the first data input/output operation is stored, and the second namespace region may be defined as an area in which data (e.g., the second map table MT2 and/or the second data D2) corresponding to the second data input/output operation is stored.

As at least one embodiment, the storage device 100' may store the first map table MT1 in the memory region 120' and perform a first data input/output operation of writing the first data D1 to the first namespace region 132' by using the first map table MT1 or reading the first data D1 from the first namespace region 132'.

In at least one embodiment, the storage device 100' may store the second map table MT2 used for the second data input/output operation and the second data D2 that is the result of the second data input/output operation in the second namespace region 132'.

Referring further to FIG. 10B, the storage device 100' may move the second map table MT2 and the second data D2 stored in the second namespace region 132' to the memory region 120'. The storage device 100' may perform a second data input/output operation of writing additional second data to the memory region 120' using the second map table MT2 or reading the second data D2 from the memory region 120'.

As at least one embodiment, the storage device 100' may store the first map table MT1 used for the first data input/output operation in the first namespace region 131'.

Figure 11A:
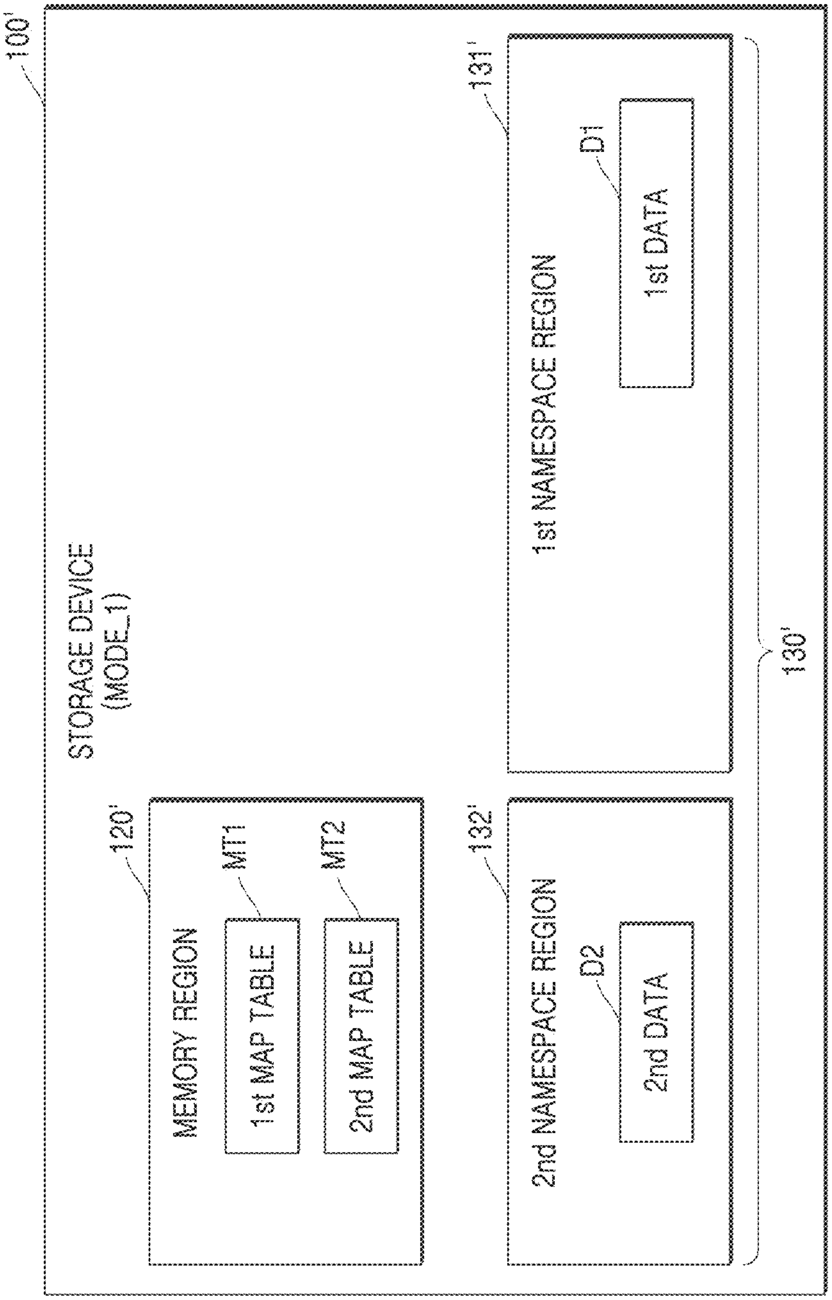
FIGS. 11A and 11B are block diagrams illustrating operations of a storage device 100' according to at least one embodiment in detail.
Figure 11B:
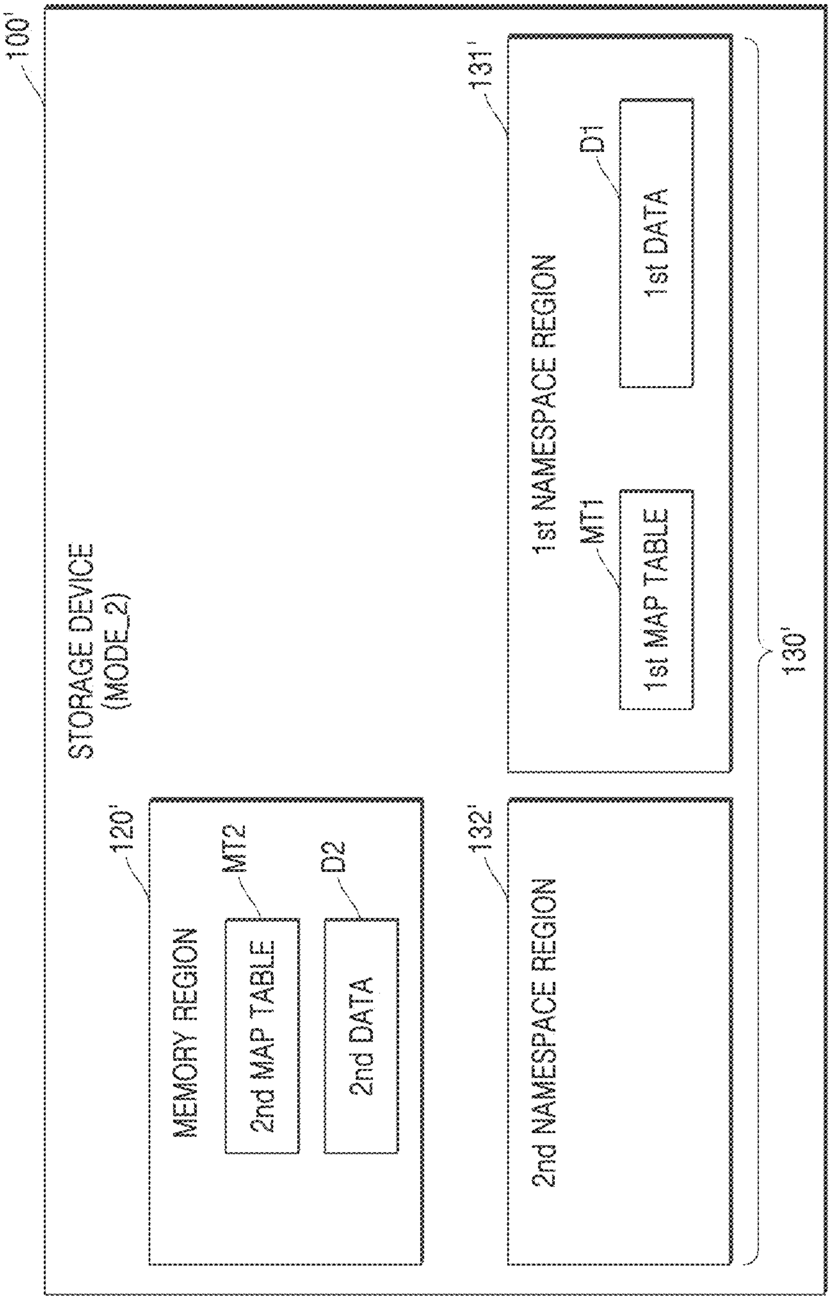

FIGS. 11A and 11B are block diagrams for describing operations of the storage device 100' according to at least one embodiment in detail. Hereinafter, contents overlapping those of FIGS. 10A and 10B are omitted. In FIG. 11A, it is assumed that the storage device 100' operates in the first mode MODE_1, and in FIG. 11B, the storage device 100' operates in the second mode MODE_2.

Referring to FIG. 11A, the storage device 100' may perform a first data input/output operation of storing the first and second map tables MT1 and MT2 in the memory region 120', and using the first map table MT1. Unlike the embodiment of FIG. 10A, the storage device 100' may continuously store the second map table MT2 in the memory region 120'.

Meanwhile, the storage device 100' may back up the second map table MT2 to the second namespace region 132', e.g., before being powered off.

In this way, as the storage device 100' stores the second map table MT2 in the memory region 120' regardless of the mode, when receiving a request for the second data D2 from the host device, the storage device 100' may minimize latency by immediately performing an operation in response to the request using the second map table MT2.

Referring further to FIG. 11B, the storage device 100' may move the second data D2 stored in the second namespace region 132' to the memory region 120'. The storage device 100' may perform a second data input/output operation of writing additional second data to the memory region 120' by using the second map table MT2 or reading the second data D2 from the memory region 120'.

As at least one embodiment, the storage device 100' may store the first map table MT1 used for the first data input/output operation in the first namespace region 131'.

However, it will be fully understood that FIGS. 10A to 11B are only examples for helping understanding of the inventive concepts, and the embodiments are not limited thereto.

Figure 12:
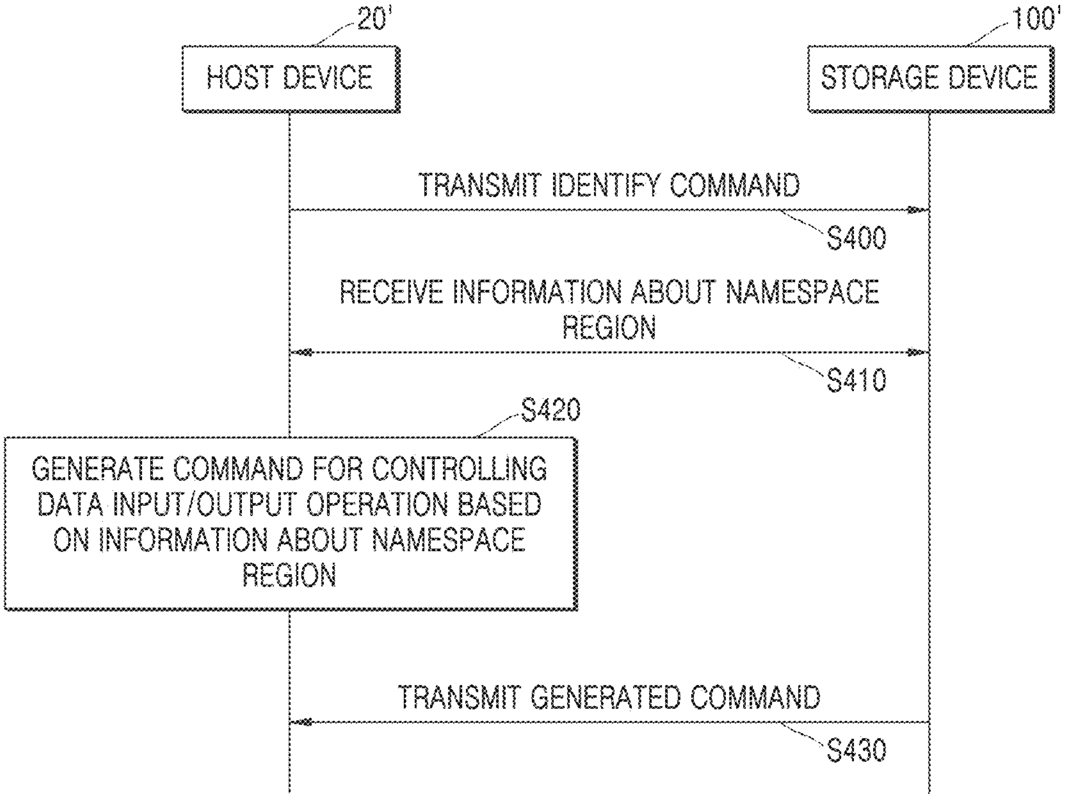
FIG. 12 is a flowchart illustrating an operating method of an electronic device according to at least one embodiment.

FIG. 12 is a flowchart illustrating a method of operating an electronic device according to at least one embodiment, and FIGS. 13A and 13B are diagrams illustrating tables TB and TB' for explaining information about the namespace region of FIG. 12. The electronic device may include a host device 20' and a storage device 100'. FIG. 12 describes an operating method of an electronic device based on the host device 200 side.

Referring to FIG. 12, at operation S400, the host device 200 may transmit an identify command to the storage device 300. As at least one embodiment, the identify command is a command defined in the NVM Express standard specification and may be, e.g., a command for identifying a namespace data structure of the storage device 300.

At operation S410, the host device 200 receives information about the namespace region from the storage device 300. For example, the information about a namespace region may indicate namespace regions included in a non-volatile memory region and formed by the non-volatile memories of the storage device 300. For example, when the first namespace region 131' and the second namespace region 132' are included as in the embodiment of FIGS. 10A and 10B, the storage device 300 may indicate that the information about the namespace region is divided into a first namespace region 131' and a second namespace region 132' in the non-volatile memory region of the storage device 300.

Further referring to the table TB of FIG. 13A, information about the namespace region may be included in "Common Namespace Features" defined in the NVM Express standard specification. The information about the namespace region may indicate that the storage device 300 includes a first namespace region and a second namespace region, a value of '00' may indicate a first namespace region of the storage device 300, and a value of '01' may indicate a second namespace region of the storage device 300.

Referring back to FIG. 12, at operation S420, the host device 200 generates a command for controlling data input/output operations of the storage device 300 based on information about the namespace region. For example, the host device 200 may check whether the storage device 300 may perform the above-described first and second data input/output operations through information about the namespace region, and based on the confirmation result, the host device 200 may generate a command for the storage device 300 to control at least one of the first and second data input/output operations.

At operation S430, the host device 200 transmits the command generated in operation S420 to the storage device 300. For example, the host device 200 may control the storage device 300 to perform a first data input/output operation by transmitting a signal having a value of '00' set together with the first command to the storage device 300. In addition, the host device 200 may control the storage device 300 to perform a second data input/output operation by transmitting a signal having a value of '01' set together with the second command to the storage device 300.

Further referring to the table TB' of FIG. 13B, the information about the namespace region may indicate that the storage device 300 includes first to fourth namespace regions, a value of '00' may indicate the first namespace region operated as a TLC of the storage device 300, a value of '01' may indicate the second namespace region, a value of '10' may indicate a third namespace region operated as a QLC, and a value of '11' may indicate a fourth namespace region operated as an MLC. The third namespace region may be used for a third data input/output operation of the storage device 300 and the fourth namespace region may be used for a fourth data input/output operation of the storage device 300. As at least one embodiment, the third and fourth data input/output operations may be performed by the first mode storage device 300 like the first data input/output operation described above. In at least one embodiment, the host device 200 may select one of the first to fourth data input/output operations based on the table TB' of FIG. 13B and control the storage device 300 to perform the selected data input/output operation.

However, it will be fully understood that FIGS. 13A and 13B are only examples for helping in understanding the inventive concepts, and the embodiments are not limited thereto.

Figure 14:
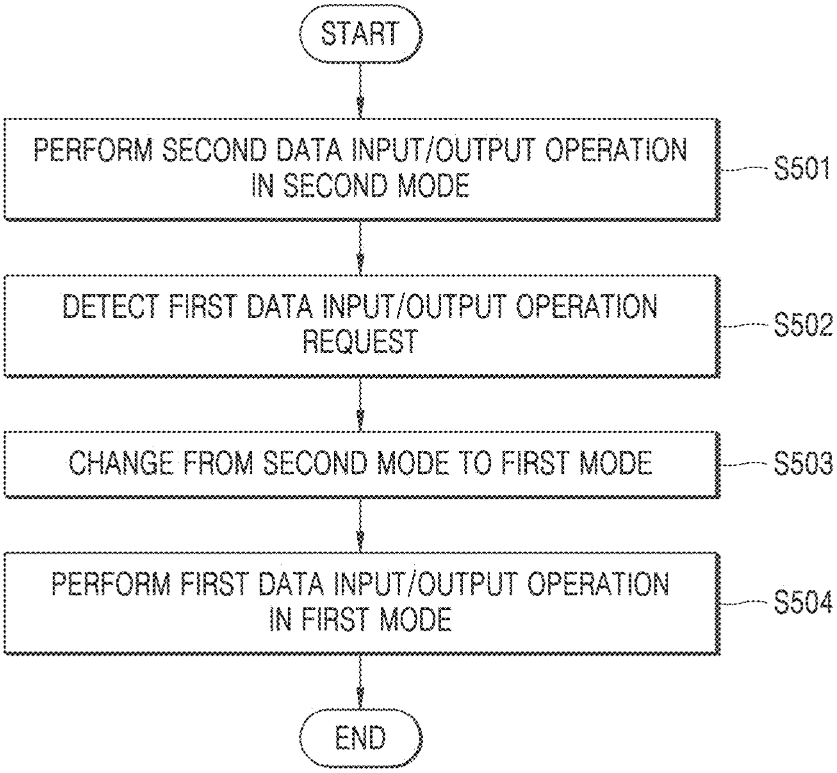
FIGS. 14 to 16 are flowcharts for describing a storage device according to embodiments.
Figure 15:
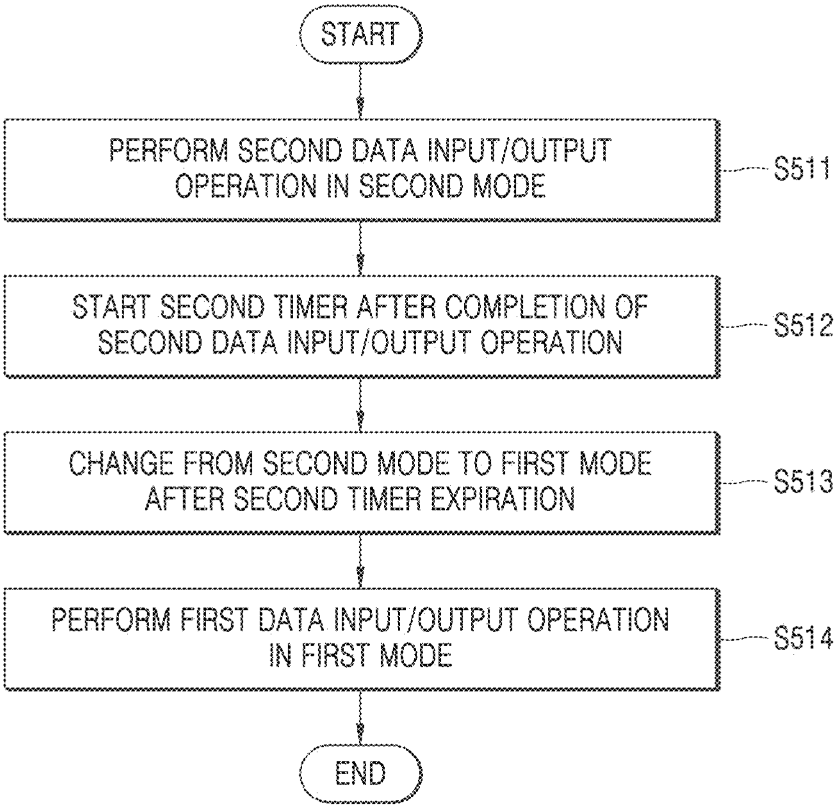
Figure 16:
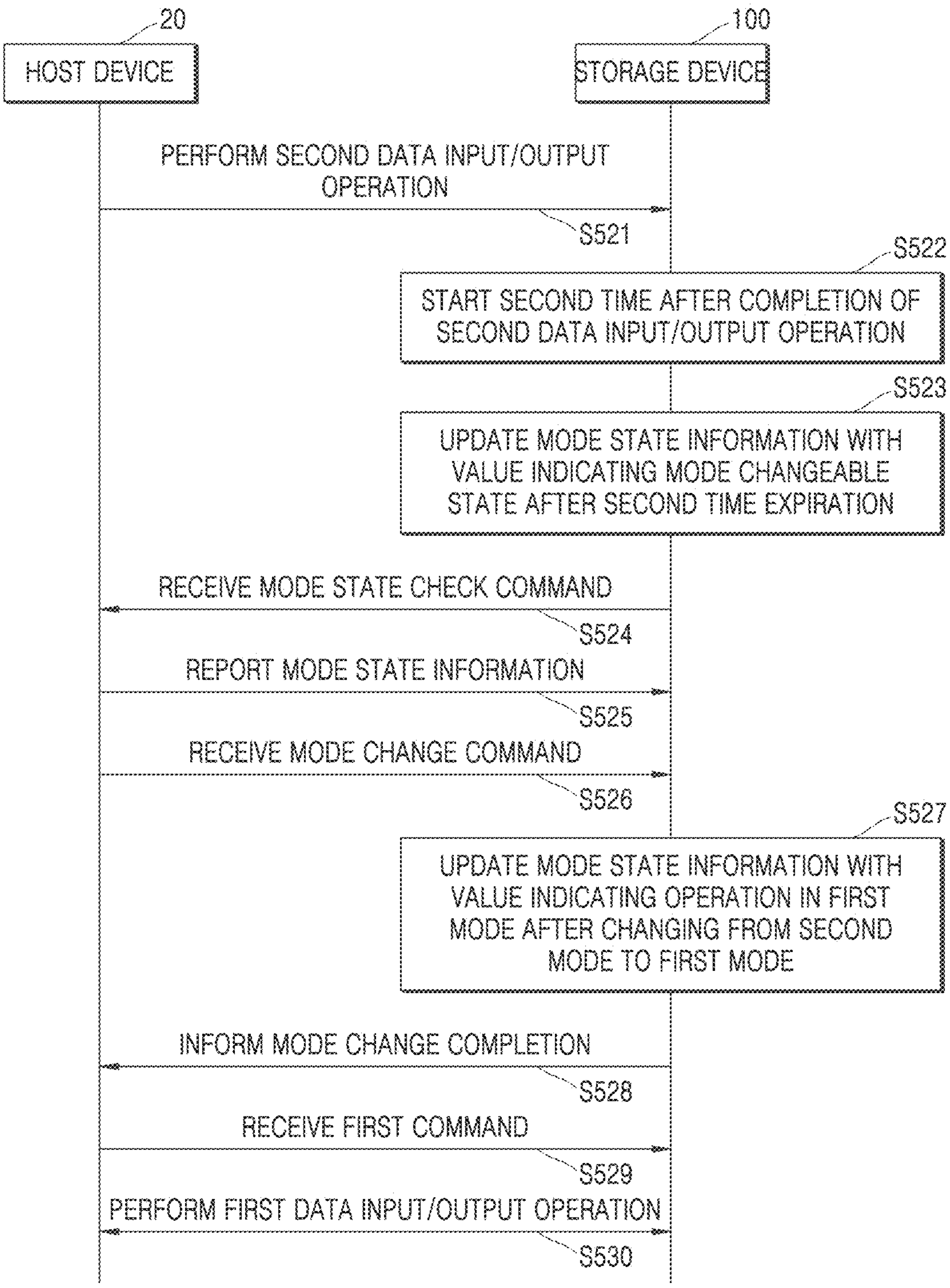

FIGS. 14 to 16 are flowcharts illustrating a storage device according to at least some embodiments. FIGS. 14 to 16 describe embodiments in which a storage device changes an operation mode from a second mode to a first mode.

Referring to FIG. 14, at operation S501, the storage device performs a second data input/output operation in the second mode.

At operation S502, the storage device detects a first data input/output operation request from the host device. In at least one embodiment, the request received from the host device includes a command and logical addresses, and the storage device may determine whether the logical addresses are associated with the non-volatile memories and detect the first data input/output operation request based on the determination result. For example, in the storage device, non-volatile memories and memories may be divided into a first namespace and a second namespace and managed, and when the logical addresses included in the request match the first namespace, the storage device may detect the first data input/output operation request.

At operation S503, the storage device changes the operation mode from the second mode to the first mode. As an example, the storage device may change the operation mode to the first mode without a separate mode change command from the host device in response to detecting the first data input/output operation request. The storage device may update the mode state information to have a value indicating current operation in the first mode.

At operation S504, the storage device performs a first data input/output operation in a first mode. For example, the storage device may perform a first data input/output operation in response to a request from the host device in the first mode.

Referring further to FIG. 15, at operation S511, the storage device performs a second data input/output operation in the second mode.

At operation S512, the storage device starts a second timer after completion of the second data input/output operation. The second timer may be reset when a request for a second data input/output operation is received from the host device. As at least one embodiment, the expiration time of the first timer described in FIG. 5 may be the same as or different from the expiration time of the second timer. In some embodiments, the expiration time of the second timer may be shorter than the expiration time of the first timer.

At operation S513, the storage device automatically changes the operation mode from the second mode to the first mode after the second timer expires. For example, the storage device may change the operation mode to the first mode without a separate mode change command from the host device in response to expiration of the second timer. The storage device may update the mode state information to have a value indicating current operation in the first mode.

At operation S514, the storage device is configured to perform a first data input/output operation in the first mode. Specifically, the storage device may perform a first data input/output operation in response to a request from the host device in the first mode.

Referring further to FIG. 16, at operation S521, the storage device 100 performs a second data input/output operation using the host device 20 and the volatile memory in the second mode.

At operation S522, the storage device 100 starts a second timer after completion of the second data input/output operation. The second timer may be reset when a request for the second data input/output operation is received from the host device 20.

At operation S523, the storage device may updates the mode state information with a value indicating a mode changeable state after the second timer expires. As described above in FIG. 6B, in the mode state information, a fourth value indicating that the second mode may be changed to the first mode is further defined, and the storage device 100 may change the mode state information from a third value (a value indicating operation in the second mode) to a fourth value.

At operation S524, the storage device 100 receives a mode state check command from the host device 20. As described above, the mode state check command may correspond to the 'get feature' command.

At operation S525, the storage device 100 reports the mode state information to the host device 20 in response to the mode state check command. For example, at operation S523, the mode state information is updated to a value indicating a mode changeable state, and at operation S525 the updated mode state information may be reported to the host device 20.

At operation S526, the storage device 100 receives a mode change command from the host device 20. For example, the host device 20 may determine that the storage device 100 is currently in a state in which the storage device 100 may change from the second mode to the first mode, based on the mode state information, and accordingly, transmit a mode change command to the storage device 100. As mentioned above, the mode change command may correspond to a set feature command.

At operation S527, the storage device 100 updates the mode state information with a value indicating that the operation mode is operated in the first mode after changing the operation mode from the second mode to the first mode.

At operation S528, the storage device 100 informs the host device 20 of the completion of the mode change.

At operation S529, the storage device 100 receives a first command from the host device 20. As described above, the first command may be, and/or include, a command for the host device 20 requesting a first data input/output operation to the storage device 100.

At operation S530, the storage device may performs a first data input/output operation using the host device 20 and non-volatile memories.

In some embodiments, the storage device 100 may directly perform operations S503 and S504 of FIG. 14 when a first data input/output operation request is detected as in operation S502 of FIG. 14 while performing operation S522.

However, FIGS. 14 to 16 are merely examples, and the embodiments are not limited thereto; for example, the storage device may change the operation mode from the second mode to the first mode in various ways so as to perform the first data input/output operation with a minimum delay in response to a request from the host device.

Figure 17:
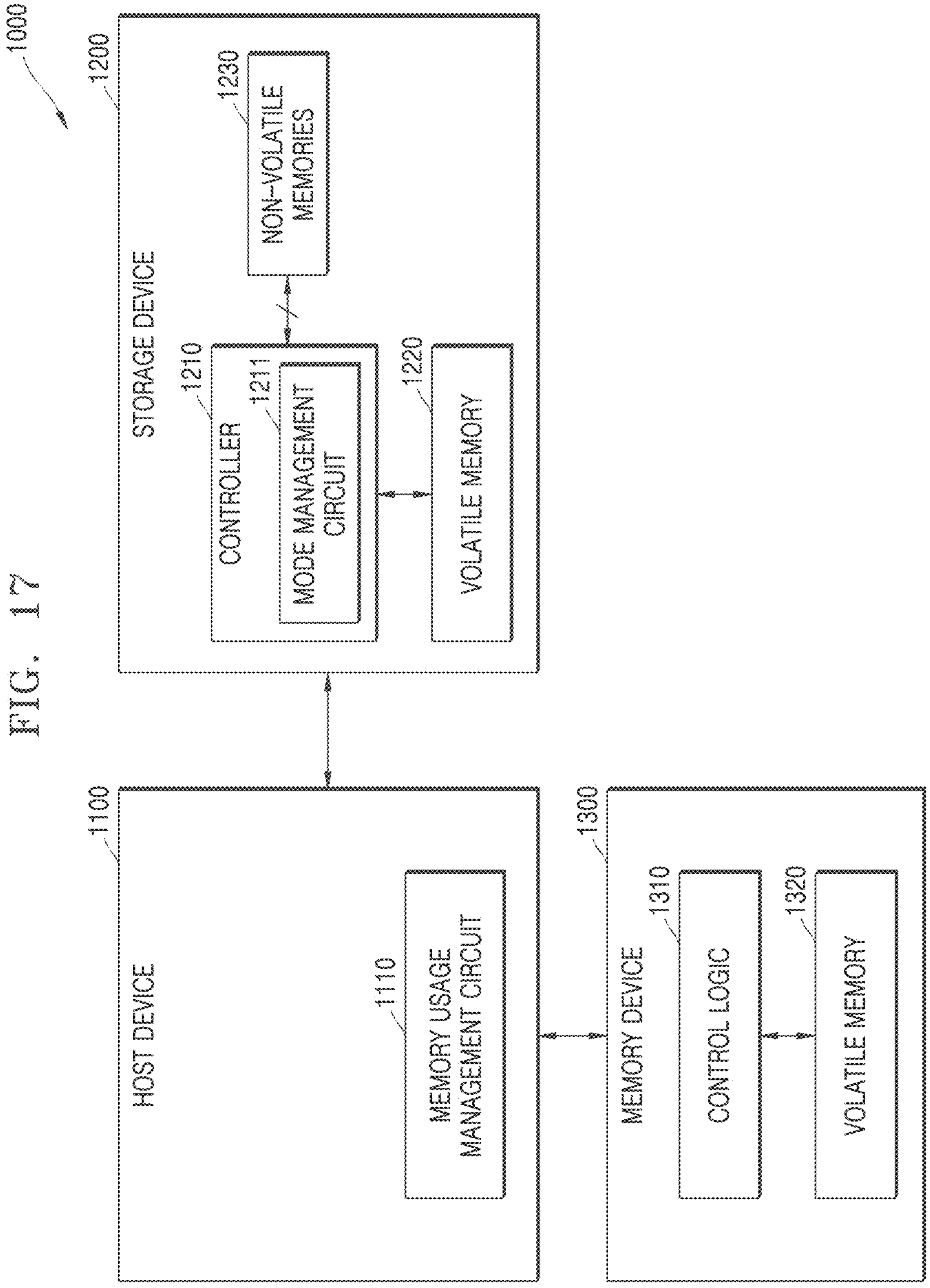
FIG. 17 is a block diagram illustrating an electronic device according to at least one embodiment.

FIG. 17 is a block diagram illustrating an electronic device 1000 according to at least one embodiment.

Referring to FIG. 17, an electronic device 1000 includes a host device 1100, a storage device 1200, and a memory device 1300.

In at least one embodiment, the storage device 1200 may include a controller 1210, a volatile memory 1220, and non-volatile memories 1230. The controller 1210 may include a mode management circuit 1211.

In at least one embodiment, the memory device 1300 may include a control logic 1310 and a volatile memory 1320. The control logic 1310 may control overall operations of the memory device 1300. The memory device 1300 may perform a third data input/output operation with the host device 1100 by using the volatile memory 1320. In some embodiments, the capacity of the volatile memory 1320 of the memory device 1300 may be greater than that of the volatile memory 1220 of the storage device 1200.

In at least one embodiment, the host device 1100 may include a memory usage management circuit 1110. The memory usage management circuit 1110 may be implemented in processing circuitry. In this specification, the operation of the memory usage management circuit 1110 may be interpreted as the operation of the host device 1100.

As at least one embodiment, to perform a fast processing operation when running an application, the memory usage management circuit 1110 may select one of the volatile memory 1220 of the storage device 1200 and the volatile memory 1320 of the memory device 1300. For example, when the memory device 1300 is currently busy and the volatile memory 1320 is unavailable, the memory usage management circuit 1110 may use the volatile memory 1220 of the storage device 1200 by changing the operation mode of the storage device 1200 from the first mode to the second mode. As another example, when the memory space of the volatile memory 1320 of the memory device 1300 is insufficient, the memory usage management circuit 1110 may use the volatile memory 1220 by changing the operation mode of the storage device 1200 from the first mode to the second mode so that the current processing operation may be preferentially performed, and then, the memory usage management circuit 1110 may back up data stored in the volatile memory 1320 to the storage device 1200 to secure memory space of the volatile memory 1320.

In at least one embodiment, the storage device 1200 may store cold data classified by the host device 1100 (e.g., from among data stored in the memory device 1300) in the first mode in the non-volatile memories 1230. For example, the storage device 1200 may perform a first data input/output operation with the host device 1100 using the non-volatile memories 1230 in the first mode, and data that is the target of the first data input/output operation may be cold data. At this time, the cold data stored in the non-volatile memories 1230 has a low frequency of access from the host device 1100, and by utilizing this advantage, the storage device 1200 performs a second data input/output operation using the volatile memory 1220 in a section where the first data input/output operation is not performed, such that a memory space of the volatile memory 1220 may be provided to the host device 1100. In at least one embodiment, the frequency of the second data input/output operation may increase as the frequency of the first data input/output operation decreases.

As at least one embodiment, the memory usage management circuit 1110 may use the storage device 1200 to effectively compensate for limitations in capacity and memory operation speed of the memory device 1300. Through this, the overall memory usage efficiency of the electronic device 1000 may be increased to reduce cost and improve performance.

Figure 18:
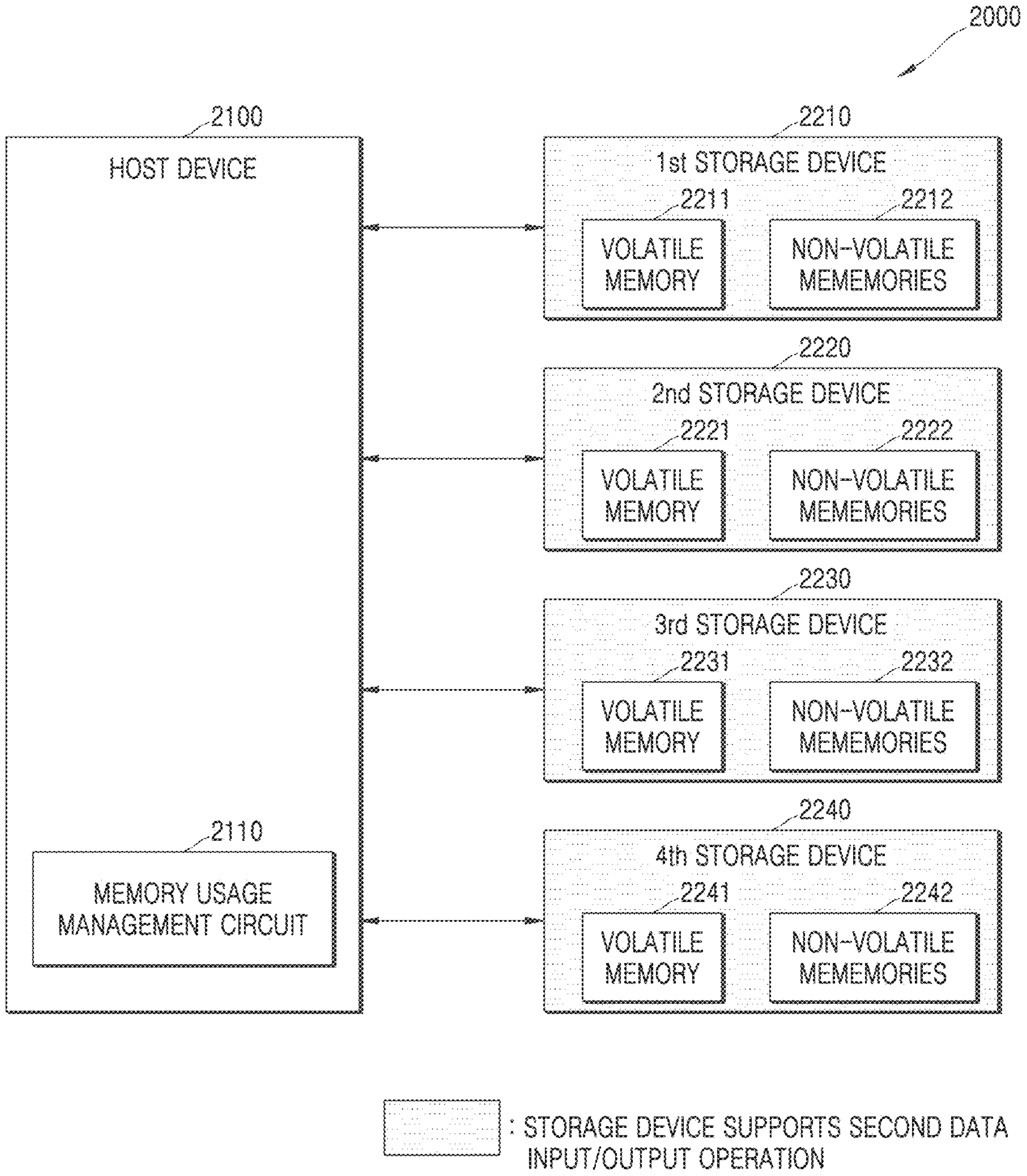
FIG. 18 is a block diagram illustrating an electronic device according to at least one embodiment.

FIG. 18 is a block diagram illustrating an electronic device 2000 according to at least one embodiment.

Referring to FIG. 18, an electronic device 2000 includes a host device 2100 and first to fourth storage devices 2210 to 2240.

In at least one embodiment, each of the first to fourth storage devices 2210 to 2240 may include volatile memories 2211 to 2241 and non-volatile memories 2212 to 2242. The first to fourth storage devices 2210 to 2240 may support the second mode according to embodiments. For example, the first to fourth storage devices 2210 to 2240 may operate in one of the first mode and the second mode.

As at least one embodiment, the host device 2100 may include a memory usage management circuit 2110. The memory usage management circuit 2110 may be implemented by processing circuitry. The memory usage management circuit 2110 may select at least one of the first to fourth storage devices 2210 to 2240 as a storage device that performs a second data input/output operation with the host device 2100. For example, the memory usage management circuit 2110 may receive a report of mode state information from the first to fourth storage devices 2210 to 2240, select a storage device in a mode changeable state among the first to fourth storage devices 2210 to 2240, and change the operation mode of the selected storage device from the first mode to the second mode.

In at least one embodiment, the memory usage management circuit 2110 may collectively transmit a mode state check command (or get feature command) to the first to fourth storage devices 2210 to 2240, and receive a report of mode state information from the first to fourth storage devices 2210 to 2240 at the same time or at a similar time. In addition, the memory usage management circuit 2110 transmits a mode change command (or set feature command) to cause the operation modes of at least two storage devices among the first to fourth storage devices 2210 to 2240 to be collectively changed from the first mode to the second mode, such that the memory usage management circuit 2110 may control at least two storage devices to simultaneously perform second data input/output operations with the host device 2100.

In some embodiments, the memory usage management circuit 2110 may sequentially transmit a mode state check command to the first to fourth storage devices 2210 to 2240, and sequentially receive reports of mode state information from the first to fourth storage devices 2210 to 2240. Also, the memory usage management circuit 2110 may control the first to fourth storage devices 2210 to 2240 to alternately perform second data input/output operations with the host device 2100.

In at least one embodiment, at least two non-volatile memories among the non-volatile memories 2212 to 2242 of the first to fourth storage devices 2210 to 2240 may have different cell types. The memory usage management circuit 2110 may control some of the first to fourth storage devices 2210 to 2240 to perform a second data input/output operation with priority based on the cell type of each of the first to fourth storage devices 2210 to 2240. For example, when the cell type of the non-volatile memories 2212 of the first storage device 2210 is a QLC and the cell type of the non-volatile memories 2222 of the second storage device 2220 is an SLC, the memory usage management circuit 2110 may control the first storage device 2210 to perform a second data input/output operation with priority over the second storage device 2220.

Figure 19:
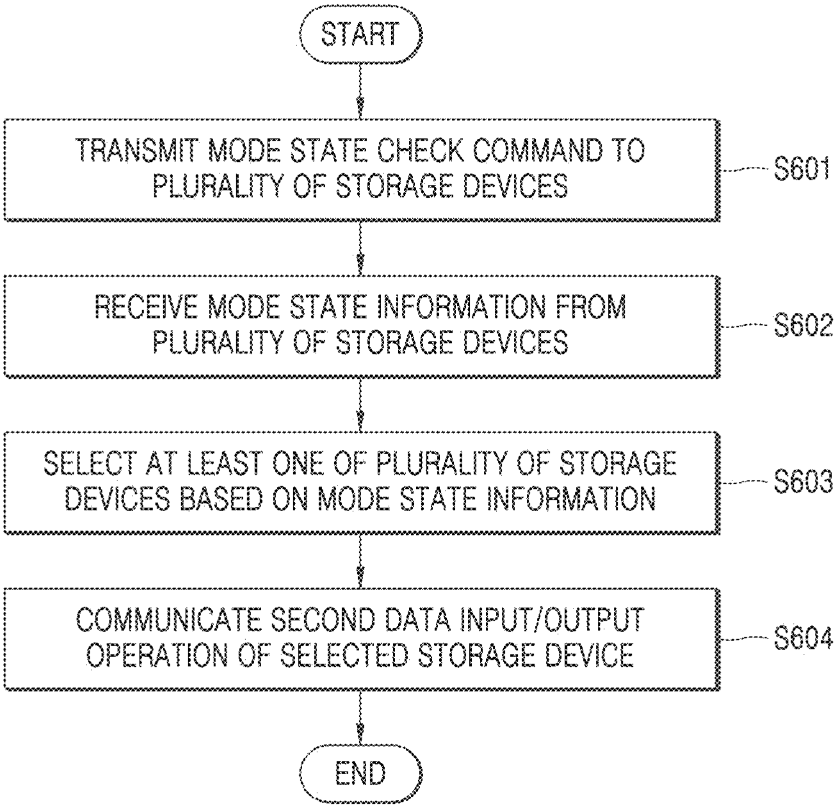
FIG. 19 is a flowchart illustrating an operating method of a host device according to at least one embodiment.

FIG. 19 is a flowchart illustrating a method of operating a host device according to at least one embodiment. The host device may communicate with at least one of a plurality of storage devices, and the plurality of storage devices may support the second mode according to embodiments.

Referring to FIG. 19, at operation S601, the host device transmits a mode state check command to a plurality of storage devices.

At operation S602, the host device receives mode state information from a plurality of storage devices.

At operation S603, the host device selects at least one of a plurality of storage devices based on the mode state information.

At operation S604, the host device communicates with the plurality of storage data, including communicating the second data input/output operation to the storage device selected in operation S603.

Figure 20A:
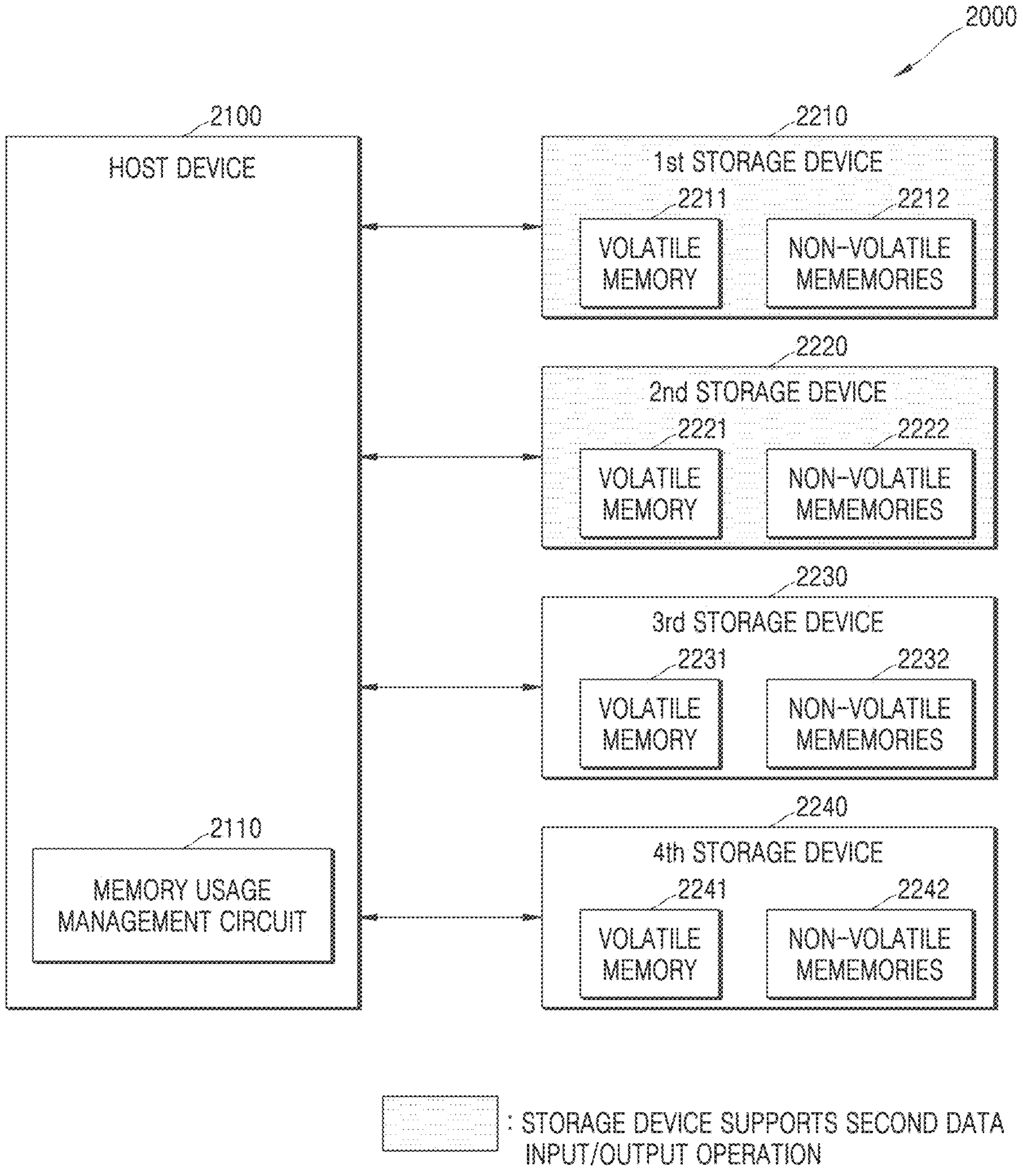
FIGS. 20A and 20B are block diagrams illustrating electronic devices according to embodiments.
Figure 20B:
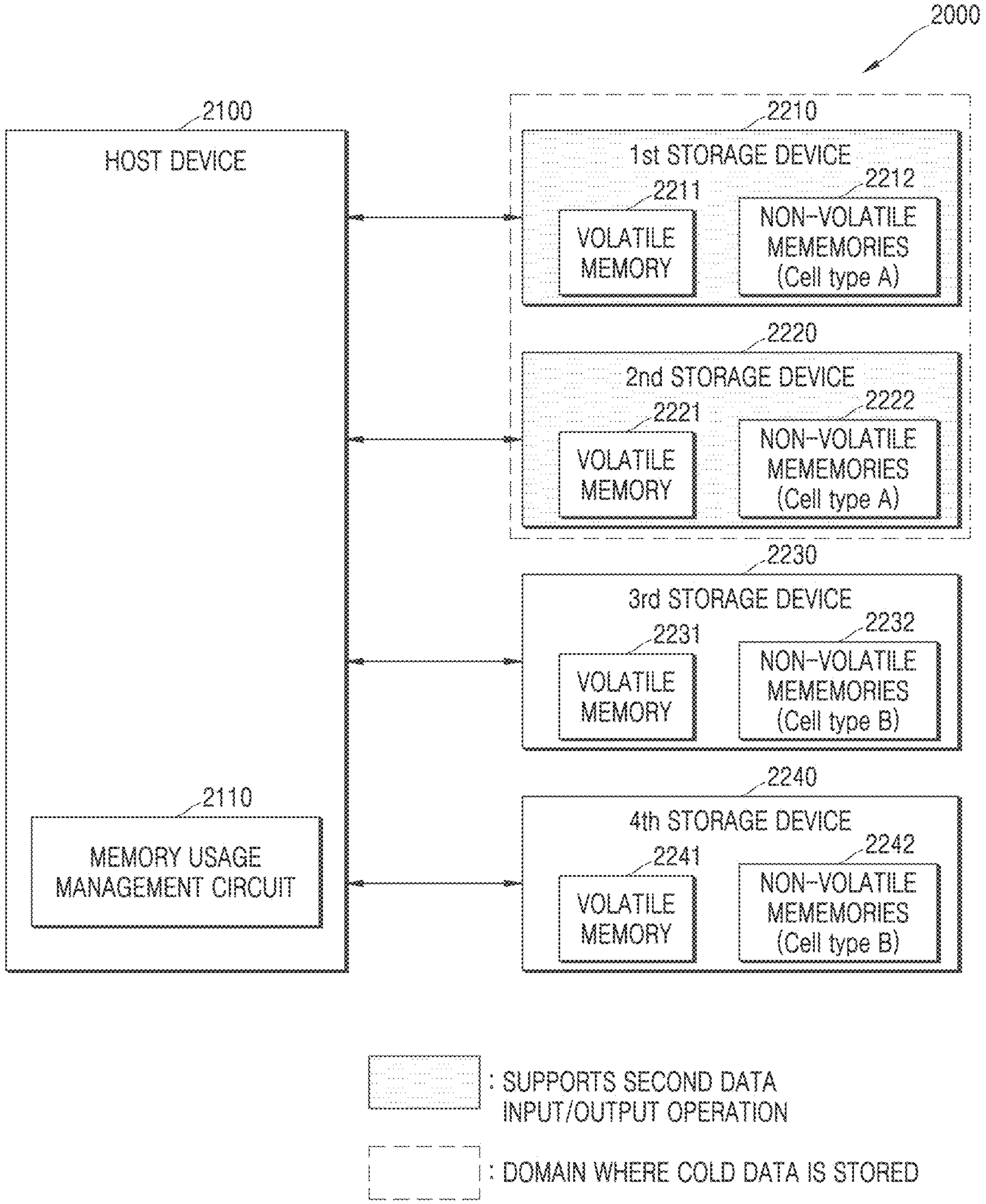

FIGS. 20A and 20B are block diagrams illustrating an electronic device 2000 according to some embodiments. In the following description, contents overlapping with those of FIG. 18 are omitted.

Referring to FIG. 20A, only first and second storage devices 2210 and 2220 among first to fourth storage devices 2210 to 2240 are configured to support the second mode. For example, the first and second storage devices 2210 and 2220 are configured to operate in one of the first mode and the second mode, and the third and fourth storage devices 2230 and 2240 are configured to operate only in the first mode.

As at least one embodiment, the memory usage management circuit 2110 may recognize in advance about the first and second storage devices 2210 and 2220 configured to support the second mode, and select at least one of the first and second storage devices 2210 and 2220 as a storage device that performs a second data input/output operation with the host device 2100. As described above with reference to FIG. 12, the memory usage management circuit 2110 may receive information about the namespace region from the first to fourth storage devices 2210 to 2240, and recognize the first and second storage devices 2210 and 2220 are configured to support the second mode based on information about the namespace region. The memory usage management circuit 2110 may transmit a mode state check command or a mode change command to change the modes of the first and second storage devices 2210 and 2200.

Further referring to FIG. 20B, the cell type of the non-volatile memories 2212 and 2222 of the first and second storage devices 2210 and 2220 supporting the first and second modes is an 'A' type, the cell type of the non-volatile memories 2232 and 2242 of the third and fourth storage devices 2230 and 2240 supporting only the first mode may be a 'B' type. For example, the 'A' type may be a higher level cell type than the 'B' type. For example, the 'A' type may be any one of a TLC and a QLC, and the 'B' type may be any one of an SLC and an MLC. However, since this is only at least one embodiment, the cell type of the non-volatile memories of the storage device supporting the second mode may be various.

As at least one embodiment, the non-volatile memories 2212 and 2222 of the first and second storage devices 2210 and 2220 may be defined as a domain in which classified cold data from the host device 2100 is stored. By performing a first data input/output operation with the host device 2100, the first and second storage devices 2210 and 2220 may write cold data to the non-volatile memories 2212 and 2222, or read from the non-volatile memories 2212 and 2222 and transmit them to the host device 2100.

As at least one embodiment, the memory usage management circuit 2110 may recognize (e.g., in advance) that the first and second storage devices 2210 and 2220 are configured for storing cold data, and select at least one of the first and second storage devices 2210 and 2220 as a storage device that performs a second data input/output operation with the host device 2100.

Cell types of non-volatile memories will be described later with reference to FIGS. 23A to 23D.

Figure 21:
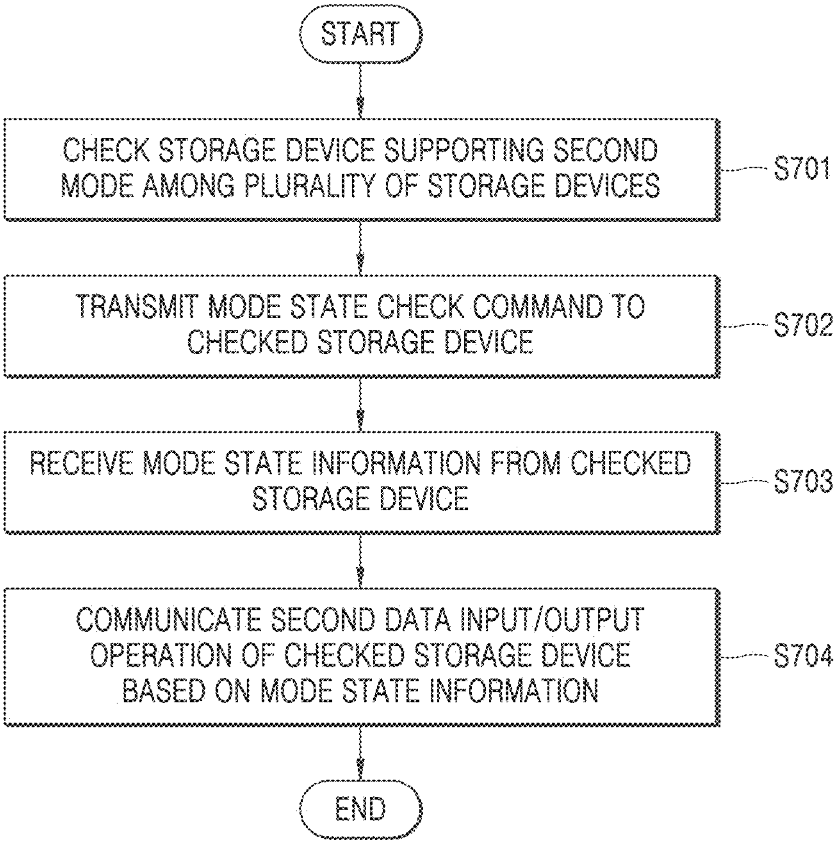
FIG. 21 is a flowchart illustrating an operating method of a host device according to at least one embodiment.

FIG. 21 is a flowchart illustrating a method of operating a host device according to at least one embodiment. The host device may communicate with at least one of a plurality of storage devices, and only some of the plurality of storage devices may be configured to support the second mode according to embodiments.

Referring to FIG. 21, at operation S701, the host device checks a storage device supporting the second mode among a plurality of storage devices. In at least one embodiment, the host device may pre-identify a storage device supporting the second mode among the plurality of storage devices in a setup process for the plurality of storage devices. For example, the host device may transmit identify commands to a plurality of storage devices to receive information about a namespace region from the plurality of storage devices, and identify a storage device supporting the second mode based on information about the namespace region. In some embodiments, the host device may identify a storage device configured to store cold data among a plurality of storage devices as a storage device supporting the second mode.

At operation S702, the host device transmits a mode state check command to the checked storage device.

At operation S703, the host device receives the mode state information from the checked storage device.

At operation S704, the host device perform a communication operation, including communicating a second data input/output operation of the identified storage device based on the mode state information.

Figure 22:
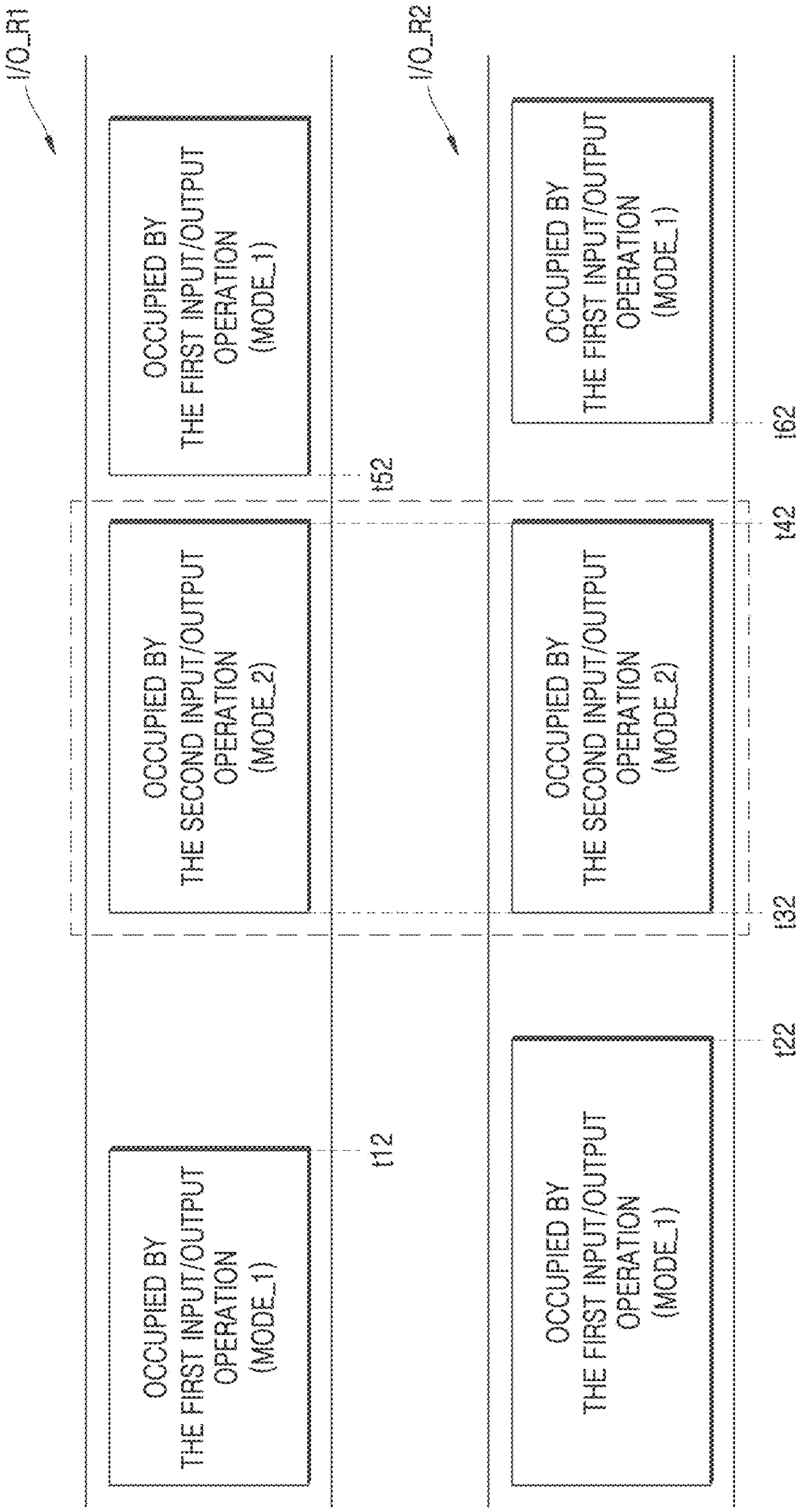
FIG. 22 is a diagram for describing operations of storage devices, based on input/output resources, according to at least one embodiment.

FIG. 22 is a diagram for describing operations of storage devices based on input/output resources I/O_R1 and I/O_R2 according to at least one embodiment. The electronic device includes a host device, a first storage device and a second storage device, and the first storage device may include first input/output resources I/O_R1 for communication with the host device, and the second storage device may include second input/output resources I/O_R2 for communication with the host device.

Referring to FIG. 22, the first input/output resources I/O_R1 may be occupied until time 't12' and after time 't52' by a first data input/output operation of a first storage device in a first mode MODE_1. The second input/output resources I/O_R2 may be occupied until time 't22' and after time 't62' by a first data input/output operation of the second storage device in the first mode MODE_1.

In the section between time 't32' and time 't42' in which the first and second input/output resources I/O_R1 and I/O_R2 are not commonly occupied by the first data input/output operation, the host device collectively changes the operation modes of the first and second storage devices from the first mode MODE_1 to the second mode MODE_2, and the first and second input/output resources I/O_R1 and I/O_R2 may be occupied by a second data input/output operation of the first and second storage devices according to a request of the host device. For example, the first and second storage devices simultaneously perform second data input/output operations with the host device so that the volatile memory space of each of the first and second storage devices may be simultaneously provided to the host device in a certain section. Through this, the host device may additionally receive a larger memory space from the first and second storage devices in a certain section.

However, this is merely an example, and the embodiments are not limited thereto, and the host device may independently control the first and second storage devices to independently perform the second data input/output operation in different sections.

FIGS. 23A to 23D are diagrams illustrating threshold voltage distributions of non-volatile memory cells written in an SLC type, an MLC type, a TLC type, and a QLC type. In FIGS. 23A to 23D, the horizontal axis indicates the threshold voltage, and the vertical axis indicates the number of memory cells.

Figure 23A:
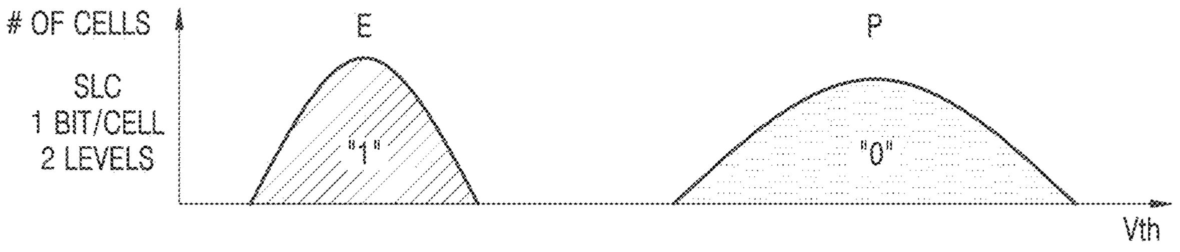
FIGS. 23A to 23D are diagrams illustrating threshold voltage distributions of non-volatile memory cells written in a single-level cell (SLC) type, a multi-level cell (MLC) type, a triple-level cell (TLC) type, and a quadruple-level cell (QLC) type.

Referring to FIG. 23A, an SLC type non-volatile memory cell may store 1-bit data, and the non-volatile memory cell may be programmed to have one of two states according to a threshold voltage distribution. In this specification, a program operation may also be referred to as a write operation. For example, a non-volatile memory cell storing data '1' may be in an erase state E, and a non-volatile memory cell storing data '0' may be in a program state P.

Figure 23B:
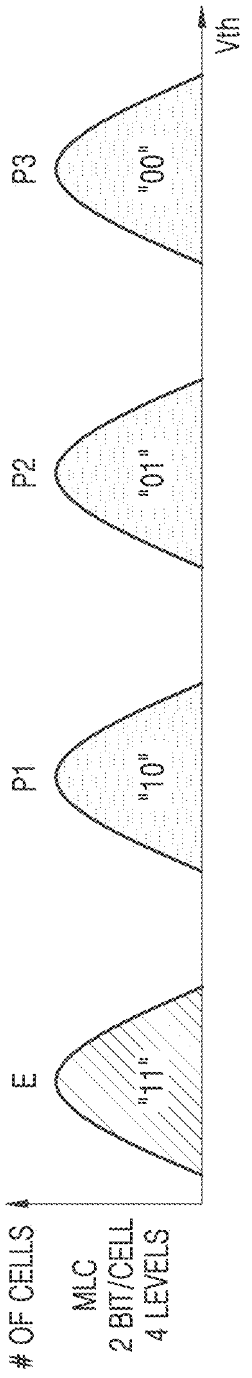

Referring further to FIG. 23B, the MLC type non-volatile memory cell may store 2-bit data, and the non-volatile memory cell may be programmed to have one of four states according to a threshold voltage distribution. For example, a memory cell storing data '11' is in an erased state E, and non-volatile memory cells respectively storing data '10', '01', and '00' may be in first to third program states P1 to P3, respectively.

Figure 23C:
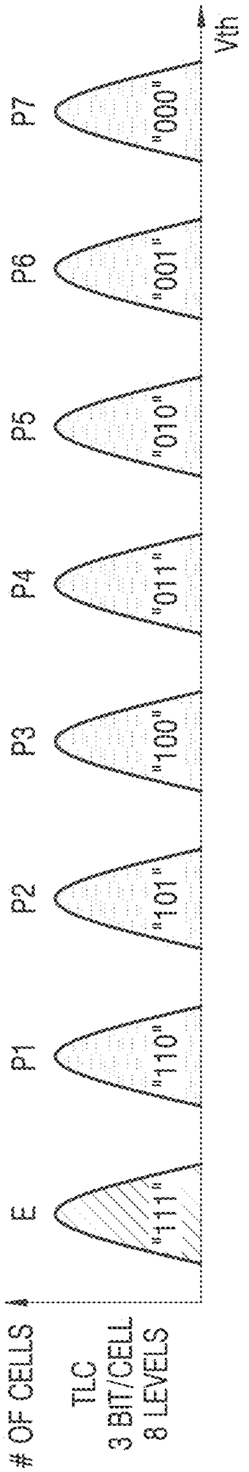

Referring further to FIG. 23C, the TLC type non-volatile memory cell may store 3-bit data, and the non-volatile memory cell may be programmed to have one of eight states according to a threshold voltage distribution. For example, a memory cell storing data '111' is in an erased state E, and non-volatile memory cells respectively storing data '110', '101', '100', '011', '010', '001', and '000' may be in first to seventh program states P1 to P7, respectively.

Figure 23D:
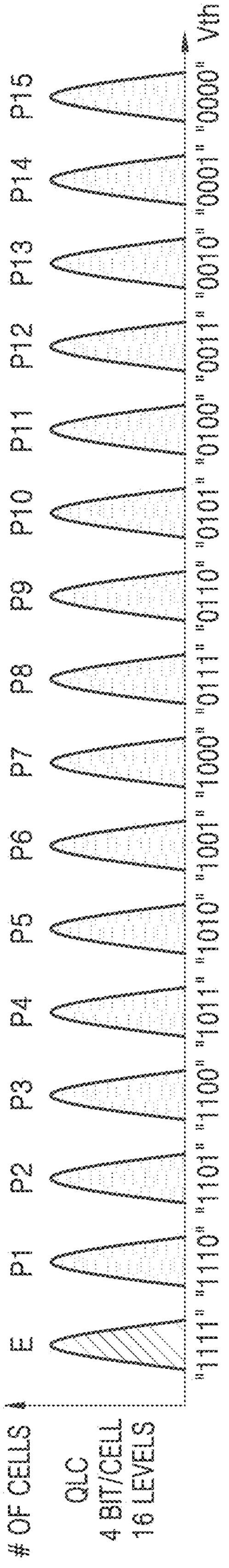

Referring further to FIG. 23D, a QLC type non-volatile memory cell may store 4-bit data, and the non-volatile memory cell may be programmed to have one of 16 states according to a threshold voltage distribution. For example, a memory cell storing data '1111' is in an erased state E, and the non-volatile memory cells respectively storing data '1110', '1101', '1100', '1011', '1010', '1001', '1000', '0111', '0110', '0101', '0100', '0011', ' 0010', '0001', and '0000' may be in first to fifteenth program states P1 to P15, respectively.

As at least one embodiment, a storage device that operates QLC-type non-volatile memories may be implemented to support the second mode according to some embodiments. In some embodiments, a storage device that operates QLC-type or TLC-type non-volatile memories may be implemented to support the second mode. In some embodiments, a storage device that operates non-volatile memories of the QLC type, TLC type, or MLC type may be implemented to support the second mode. In some embodiments, a storage device that operates non-volatile memories of the QLC type, TLC type, MLC type, or SLC type may be implemented to support the second mode.

However, this is only an example, and the embodiments are not limited thereto, and the storage device may operate non-volatile memories in a higher level cell type than the QLC type, and in this case, the storage device may be implemented to support the second mode.

Figure 24:
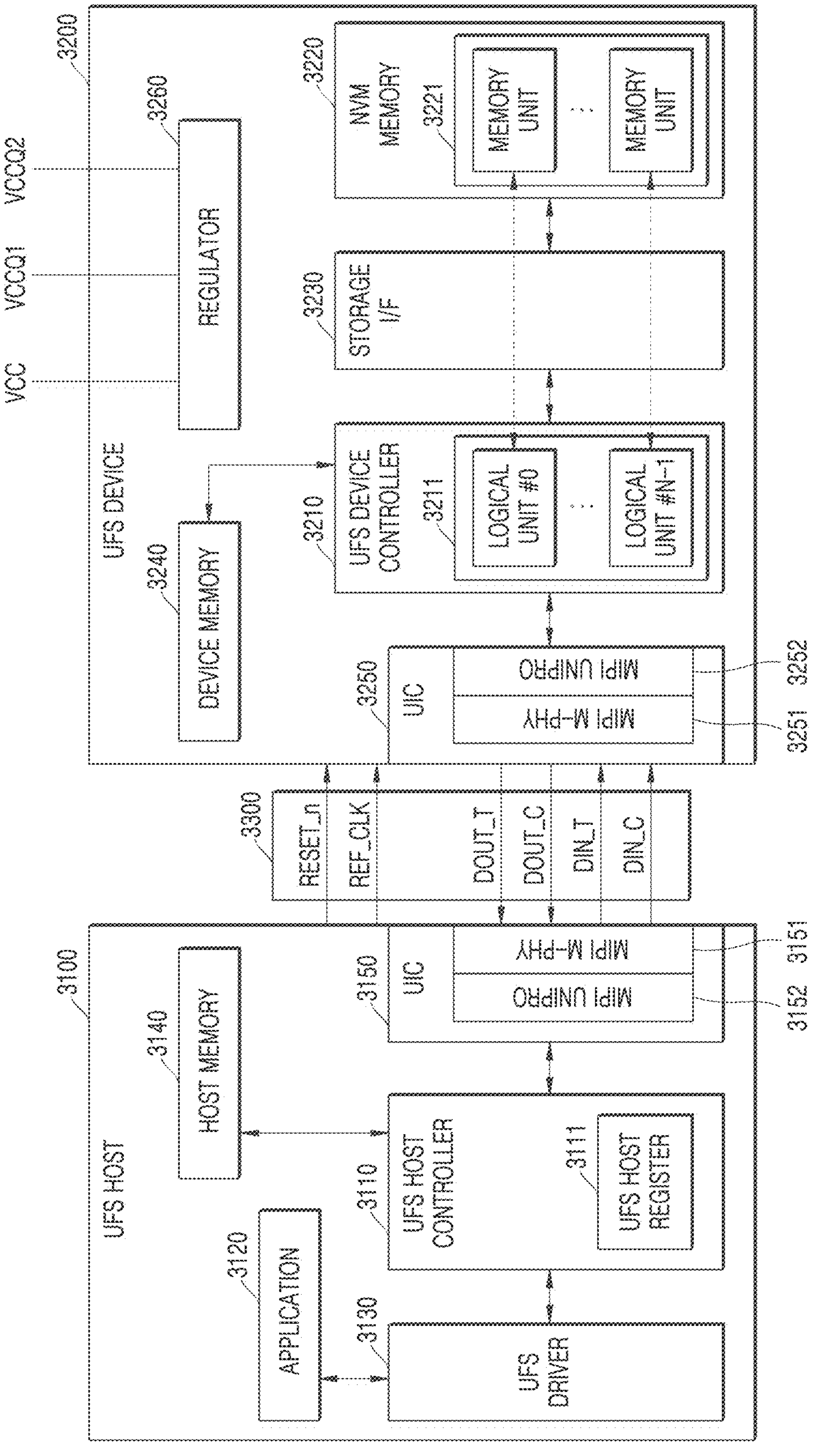
FIG. 24 is a block diagram schematically illustrating a universal flash storage (UFS) system according to at least one embodiment.

FIG. 24 is a schematic block diagram of a universal flash storage (UFS) system 3000 according to at least one embodiment. The UFS system 3000 is a system conforming to the UFS standard announced by the Joint Electron Device Engineering Council (JEDEC), and may include a UFS host 3100, a UFS device 3200, and a UFS interface 3300. The description of the host device 20 and the storage device 100 described in FIG. 1 and the like may also be applied to the UFS system 3000 within a range that does not conflict with the description of FIG. 24. That is, the UFS host 3100 may include at least some components of the host device 20 of FIG. 1 and the like, and the UFS device 3200 may include at least some components of the storage device 100 of FIG. 1.

As an example embodiment, the UFS device 3200 is configured to support the second mode according to embodiments. Specifically, the UFS host 3100 may change the operation mode of the UFS device 3200 from the first mode to the second mode, and in the second mode, the UFS device 3200 may perform a second data input/output operation with the UFS host 3100 using the device memory 3240. In addition, the UFS device 3200 may perform a first data input/output operation with the UFS host 3100 using the non-volatile memory 3220 in the first mode.

Referring to FIG. 24, a UFS host 3100 and a UFS device 3200 may be interconnected through a UFS interface 3300. The UFS host 3100 may include a UFS host controller 3110, an application 3120, a UFS driver 3130, a host memory 3140, and a UFS interconnect (UIC) layer 3150. The UFS device 3200 may include a UFS device controller 3210, a non-volatile memory 3220, a storage interface 3230, a device memory 3240, a UIC layer 3250, and a regulator 3260. The non-volatile memory 3220 may be composed of a plurality of memory units 3221, and the memory unit 3221 may include a V-NAND flash memory having a 2D structure or a 3D structure, but may include other types of non-volatile memory such as PRAM and/or RRAM. The UFS device controller 3210 and the non-volatile memory 3220 may be connected to each other through the storage interface 3230. The storage interface 3230 may be implemented to comply with a standard protocol such as toggle or ONFI.

The application 3120 may mean a program that wants to communicate with the UFS device 3200 to use the function of the UFS device 3200. The application 3120 may transmit an input/output request to the UFS driver 3130 for input/output to the UFS device 3200. The input/output request may refer to a read request, a write request, and/or a discard request of data, but the embodiments are not necessarily limited thereto.

The UFS driver 3130 is configured to manage the UFS host controller 3110 through a UFS-host controller interface (HCI). The UFS driver 3130 may convert the input/output request generated by the application 3120 into a UFS command defined by the UFS standard, and transmit the converted UFS command to the UFS host controller 3110. One input-output request may be converted into a plurality of UFS commands. A UFS command may be basically a command defined by the SCSI standard, but may also be a command dedicated to the UFS standard.

The UFS host controller 3110 may transmit the UFS command converted by the UFS driver 3130 to the UFS interconnect (UIC) layer 3250 of the UFS device 3200 through the UIC layer 3150 and the UFS interface 3300. In this process, the UFS host register 3110 of the UFS host controller 3111 may serve as a command queue CQ.

The UIC layer 3150 of the UFS host 3100 side may include a MIPI M-PHY 3151 and a MIPI UniPro 3152, and the UIC layer 3250 of the UFS device 3200 side may also include a MIPI M-PHY 3251 and a MIPI UniPro 3252.

The UFS interface 3300 may include a line for transmitting the reference clock REF_CLK, a line for transmitting a hardware reset signal RESET_n for the UFS device 3200, a pair of lines for carrying a differential input signal pair DIN_t and DIN_c, and a pair of lines for transmitting the differential output signal pair DOUT_t and DOUT_c.

The frequency value of the reference clock provided from the UFS host 3100 to the UFS device 3200 may be one of four values of 19.2 MHz, 26 MHz, 38.4 MHz, and 52 MHz, but the embodiments are not limited thereto. The UFS host 3100 may change the frequency value of the reference clock during operation, that is, while data transmission/reception is performed between the UFS host 3100 and the UFS device 3200. The UFS device 3200 may generate clocks of various frequencies from the reference clock provided from the UFS host 3100 using a phase-locked loop (PLL) and/or the like. Also, the UFS host 3100 may set a data rate value between the UFS host 3100 and the UFS device 3200 through the frequency value of the reference clock. For example, the value of the data rate may be determined depending on the frequency value of the reference clock.

The UFS interface 3300 may support a plurality of lanes, and each lane may be implemented as a differential pair. For example, the UFS interface 3300 may include one or more receive lanes and one or more transmit lanes. For example, in reference with FIG. 15, a pair of lines transmitting a pair of differential input signals (DIN_T and DIN_C) may constitute a receive lane, and a pair of lines transmitting a pair of differential output signals DOUT_T and DOUT_C may constitute a transmit lane, respectively. Although one transmit lane and one receive lane are illustrated in FIG. 24, the number of transmit lanes and receive lanes may be changed.

The receive lane and transmit lane may transmit data in a serial communication method, and full-duplex communication between the UFS host 3100 and the UFS device 3200 is possible by a structure in which the receive lane and the transmit lane are separated. That is, the UFS device 3200 may transmit data to the UFS host 3100 through the transmit lane while receiving data from the UFS host 3100 through the receive lane. In addition, control data such as commands from the UFS host 3100 to the UFS device 3200, and user data that the UFS host 3100 intends to store in or read from the non-volatile memory 3220 of the UFS device 3200 may be transmitted through the same lane. Accordingly, there is no need to further provide a separate lane for data transmission between the UFS host 3100 and the UFS device 3200 in addition to the pair of receive lanes and the pair of transmit lanes.

The UFS device controller 3210 of the UFS device 3200 may control overall operation of the UFS device 3200. The UFS device controller 3210 may manage the non-volatile memory 3220 through a logical unit (LU) 3211 which is a logical data storage unit. The number of LUs 3211 may be 8, but is not limited thereto.

The UFS device controller 3210 may include a flash translation layer (FTL), and convert a logical data address transmitted from the UFS host 3100, for example, a logical page number (LPN) or a logical block address (LBA), into a physical data address, for example, a physical page number (PPN) or a physical block address (PBA) using FTL address mapping information.

When a command from the UFS host 3100 is input to the UFS device 3200 through the UIC layer 3250, the UFS device controller 3210 may perform an operation according to the input command, and transmit a completion response to the UFS host 3100 when the operation is completed.

As an example, when the UFS host 3100 intends to store user data in the UFS device 3200, the UFS host 3100 may transmit a data storage command to the UFS device 3200. Upon receiving a response indicating that user data is ready-to-transfer from the UFS device 3200, the UFS host 3100 may transmit user data to the UFS device 3200. The UFS device controller 3210 temporarily may store the received user data in the device memory 3240, and store the user data temporarily stored in the device memory 3240 in the selected location of the non-volatile memory 3220 based on the address mapping information of the FTL.

As another example, when the UFS host 3100 wants to read user data stored in the UFS device 3200, the UFS host 3100 may transmit a data read command to the UFS device 3200. The UFS device controller 3210 that receives the command may read user data from the non-volatile memory 3220 and temporarily store the read user data in the device memory 3240 based on the data read command. In this reading process, the UFS device controller 3210 may detect and correct errors in the read user data using a built-in error correction code (ECC) engine (not shown). In particular, the ECC engine may generate parity bits for input data to be written to the non-volatile memory 3220, and the generated parity bits may be stored in the non-volatile memory 3220 together with the write data. When reading data from the non-volatile memory 3220, the ECC engine may correct errors in the read data using parity bits read from the non-volatile memory 3220 together with the read data, and output error-corrected read data.

In addition, the UFS device controller 3210 may transmit user data temporarily stored in the device memory 3240 to the UFS host 3100. In addition, the UFS device controller 3210 may further include an advanced encryption standard (AES) engine (not shown). The AES engine may perform at least one of an encryption operation and a decryption operation on data input to the UFS device controller 3210 using a symmetric-key algorithm.

The UFS host 3100 may sequentially store commands to be transmitted to the UFS device 3200 in the UFS host register 3111, which may function as a command queue, and may transmit the commands to the UFS device 3200 in this order. At this time, even if a previously transmitted command is still being processed by the UFS device 3200, that is, even before a previously transmitted command is notified by the UFS device 3200 that processing has been completed, the UFS host 3100 may transmit the next command waiting in the command queue to the UFS device 3200, and accordingly, the UFS device 3200 may also receive the next command from the UFS host 3100 while processing the previously transmitted command. The maximum number of commands (queue depth) that may be stored in such a command queue may be, for example, 32. In addition, the command queue may be implemented as a circular queue type indicating the start and end of the command sequence stored in the queue, respectively, through a head pointer and a tail pointer.

Each of the plurality of memory units 3221 may include a memory cell array (not shown) and a control circuit (not shown) for controlling an operation of the memory cell array. The memory cell array may include a two-dimensional memory cell array or a three-dimensional memory cell array. The memory cell array includes a plurality of memory cells, and each memory cell may be an SLC that stores one bit of information, but may be a cell that stores information of two or more bits, such as an MLC, a TLC, or a QLC. The three-dimensional memory cell array may include vertical NAND strings that are vertically oriented such that at least one memory cell is positioned on top of another memory cell.

VCC, VCCQ, VCCQ2, and the like may be input to the UFS device 3200 as a power supply voltage. VCC represents a main power supply voltage for the UFS device 3200 and may have a value of about 2.4 to about 3.6V. VCCQ represents a power supply voltage for supplying a low-range voltage, and is mainly for the UFS device controller 3210, and may have a value of about 1.14 to about 1.26V. VCCQ2 represents a power supply voltage to supply a lower voltage than VCC but higher than VCCQ, and is mainly for an input/output interface such as the MIPI M-PHY 3251, and may have a value of about 1.7 V to about 1.95 V. The power supply voltages may be supplied for each component of the UFS device 3200 through the regulator 3260. The regulator 3260 may be implemented as a set of unit regulators respectively connected to different ones of the aforementioned power supply voltages.

Figure 25:
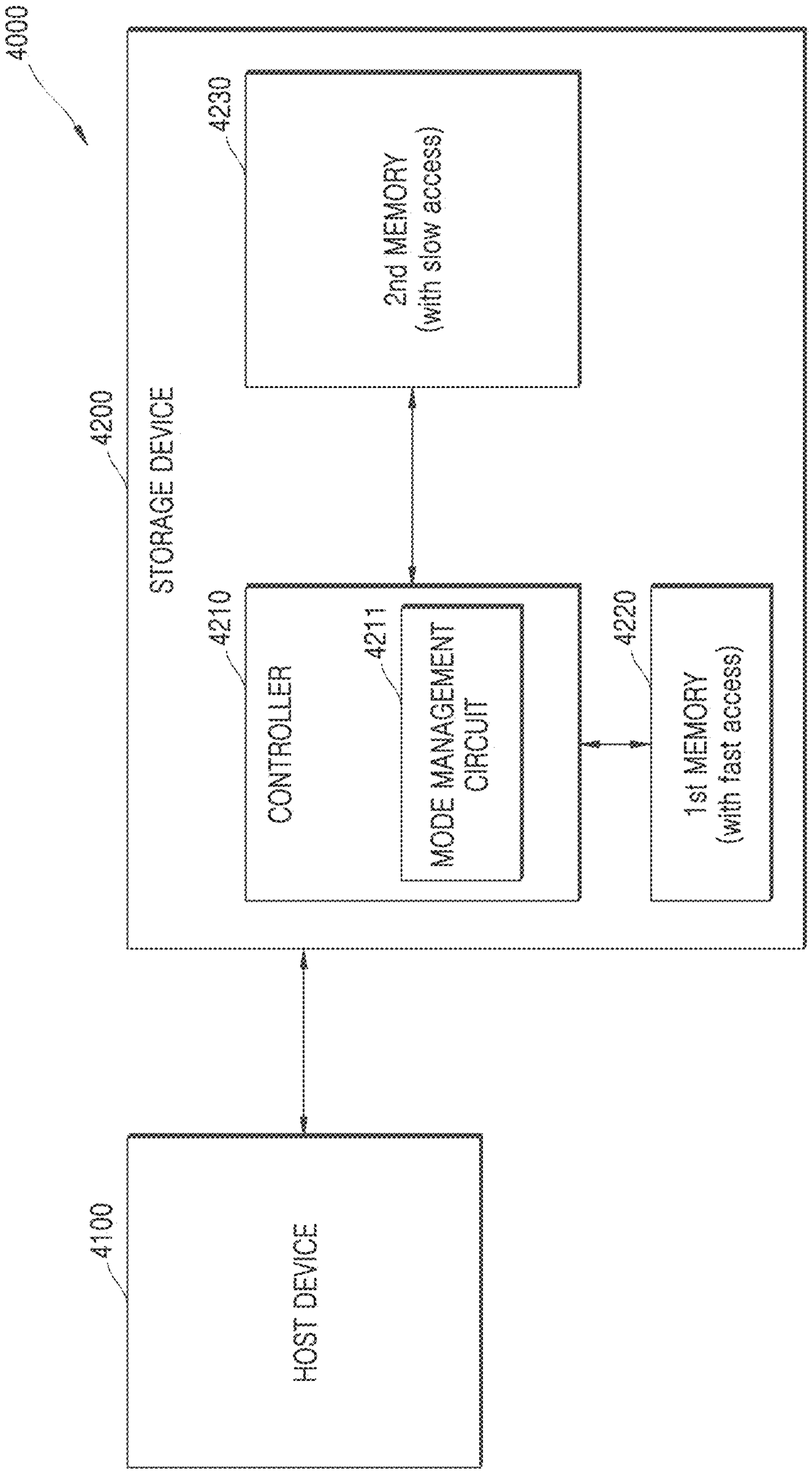
FIG. 25 is a schematic block diagram of an electronic device according to at least one embodiment.

FIG. 25 is a schematic block diagram of an electronic device 4000 according to at least one embodiment.

Referring to FIG. 25, the electronic device 4000 may include a host device 4100 and a storage device 4200. The storage device 4200 may include a controller 4210, a first memory 4220, and a second memory 4230. The controller 4210 may include a mode management circuit 4211.

In at least one embodiment, the first memory 4220 may be a memory capable of faster access than the second memory 4230. For example, the first memory 4220 may be a volatile memory, and the second memory 4230 may be a non-volatile memory. As another example, the first and second memories 4220 and 4230 may be non-volatile memories.

According to example embodiments, the controller 4210 may manage the first and second modes of the storage device 4200 through the mode management circuit 4211. The storage device 4200 may perform a first data input/output operation with the host device 4100 using the second memory 4230 based on the first map table stored in the first memory 4220 in the first mode under the control of the controller 4210. Also, the storage device 4200 may perform a second data input/output operation with the host device 4100 using the second memory 4230 based on the second map table stored in the first memory 4220 in the second mode under the control of the controller 4210. As above, the embodiments have been disclosed in the drawings and specifications.

While the inventive concepts have been particularly shown and described with reference to embodiments thereof, it will be understood that various changes in form and details may be made therein without departing from the spirit and scope of the following claims.

What is claimed is:

1. A storage device comprising:

a first memory;

a plurality of non-volatile memories having an access speed slower than an access speed of the first memory; and a controller configured to control a first data input/output operation with a host device using the plurality of non-volatile memories, based on a first map table stored in the first memory, in a first mode, and control a second data input/output operation with the host device using the first memory, based on a second map table stored in the first memory, in a second mode, wherein the first map table includes physical addresses of the plurality of non-volatile memories for accessing first data from the plurality of non-volatile memories, the first data corresponding to the first data input/output operation, wherein the storage device is configured to switch between the first mode and the second mode, wherein the controller is configured to control the storage device to move the first map table from the first memory to the plurality of non-volatile memories when changing from the first mode to the second mode, move second data related to the second data input/output operation from the plurality of non-volatile memories to the first memory when changing from the first mode to the second mode, move the first map table from the plurality of non-volatile memories to the first memory when changing from the second mode to the first mode, and move the second data related to the second data input/output operation from the first memory to the plurality of non-volatile memories when changing from the second mode to the first mode, wherein the second map table includes physical addresses of the first memory for accessing the second data from the first memory, wherein the second map table and the second data are stored separately in the first memory during the second mode, and wherein the controller is configured to start a timer in response to the second data input/output operation completing, update and transmit mode state information to the host device in response to the timer expiring, and change the mode of the storage device in response to receiving a mode change command from the host device.

2. The storage device of claim 1, wherein the first map table indicates a mapping relationship between first logical addresses of the host device and the physical addresses of the plurality of non-volatile memories, and the second map table indicates a mapping relationship between second logical addresses of the host device and the physical addresses of the first memory.

3. The storage device of claim 1, wherein the controller is further configured to, when changing from the first mode to the second mode, control the storage device to move the second map table from the plurality of non-volatile memories to the first memory.

4. The storage device of claim 1, wherein the controller is configured to, when changing from the second mode to the first mode, control the storage device to further move data related to the second map table from the first memory to the plurality of non-volatile memories.

5. The storage device of claim 1, wherein the second map table is stored in the first memory in the first mode and the second mode.

6. The storage device of claim 1, wherein the controller is configured to manage the mode state information, the mode state information having at least one of a first value indicating a state of operating in the first mode, a second value indicating a state in which the first mode is changed to the second mode, a third value indicating a state of operating in the second mode, or a fourth value indicating that a state in which the second mode is changed to the first mode, and report the mode state information to the host device in response to receiving a mode state check command from the host device.

7. The storage device of claim 6, wherein the controller is configured to change the first mode to the second mode and update the mode state information from the second value to the third value in response to receiving, from the host device, the mode change command and the mode state information having the second value.

8. The storage device of claim 6, wherein the controller is configured to change from the second mode to the first mode and update the mode state information from the fourth value to the first value in response to receiving, from the host device, the mode change command and the mode state information having the fourth value.

9. The storage device of claim 1, wherein the first memory is a volatile memory.

10. The storage device of claim 1, wherein the second data input/output operation includes transferring data from a first namespace region of the plurality of non-volatile memories to the first memory, and the first data input/output operation includes writing data to a second namespace region of the plurality of non-volatile memories.

11. The storage device of claim 1, wherein the controller is configured to, when changing from the first mode to the second mode, control the storage device to move data related to the second map table and to the second data input/output operation from the plurality of non-volatile memories to the first memory.

12. The storage device of claim 11, wherein the storage device is configured to automatically change from the first mode to the second mode in response to not receiving the first data input/output operation within a present time period.

13. The storage device of claim 12, wherein the storage device is configured to return the data related to the second map table and to the second data input/output operation to the plurality of non-volatile memories.

14. The storage device of claim 12, wherein the storage device is configured to change back to the first mode in response to receiving the first data input/output operation.

15. A storage device comprising:

a volatile memory;

a plurality of non-volatile memories;

input/output resources configured to communicate with a host device; and a controller configured to control a second data input/output operation with the host device using the volatile memory during a mode in which the input/output resources are not occupied by a first data input/output operation using the plurality of non-volatile memories, wherein the volatile memory is configured to store a first map table including physical addresses of the plurality of non-volatile memories for accessing first data corresponding to the first data input/output operation from the plurality of non-volatile memories, and store a second map table including physical addresses of the volatile memory for accessing second data corresponding to the second data input/output operation from the volatile memory, and wherein the controller is configured to control the storage device to move the first map table from the volatile memory to the plurality of non-volatile memories when changing from a first mode to the mode in which the input/output resources are not occupied by the first data input/output operation, move the second data corresponding to the second data input/output operation from the plurality of non-volatile memories to the volatile memory when changing from the first mode to the mode in which the input/output resources are not occupied by the first data input/output operation, move the first map table from the plurality of non-volatile memories to the volatile memory when changing from the mode in which the input/output resources are not occupied by the first data input/output operation to the first mode, and move the second data corresponding to the second data input/output operation from the volatile memory to the plurality of non-volatile memories when changing from the mode in which the input/output resources are not occupied by the first data input/output operation to the first mode, wherein the second map table and the second data are stored separately in the volatile memory during the mode in which the input/output resources are not occupied by the first data input/output operation, wherein the controller is configured to start a timer in response to the second data input/output operation completing, update and transmit mode state information to the host device in response to the timer expiring, and change the mode of the storage device in response to receiving a mode change command from the host device.

16. The storage device of claim 15, wherein the mode in which the input/output resources are not occupied by the first data input/output operation is a second mode and a mode in which the input/output resources are occupied by the first data input/output operation is the first mode, and the controller is configured to change from the second mode to the first mode in response to detecting a first data input/output operation request from the host device.

17. The storage device of claim 16, wherein the change from the second mode to the first mode includes moving data related to the second map table from the volatile memory to the plurality of non-volatile memories.

18. The storage device of claim 17, wherein the first map table indicates a mapping relationship between first logical addresses of the host device and physical addresses of the plurality of non-volatile memories, and the second map table indicates a mapping relationship between second logical addresses of the host device and physical addresses of the volatile memory.

* * * * *